(12) United States Patent
Jang et al.

(10) Patent No.: US 12,293,565 B2
(45) Date of Patent: May 6, 2025

(54) METHOD AND APPARATUS FOR CLASSIFYING OBJECT AND RECORDING MEDIUM STORING PROGRAM TO EXECUTE THE METHOD

(71) Applicants: HYUNDAI MOTOR COMPANY, Seoul (KR); KIA CORPORATION, Seoul (KR); INDUSTRY-ACADEMIC COOPERATION FOUNDATION, YONSEI UNIVERSITY, Seoul (KR)

(72) Inventors: So Jin Jang, Seoul (KR); Jin Kyu Hwang, Suwon-si (KR); Hyun Ju Kim, Yongin-si (KR); Min Seong Park, Seoul (KR); Won Je Jang, Goyang-si (KR); Eun Tai Kim, Seoul (KR)

(73) Assignees: HYUNDAI MOTOR COMPANY, Seoul (KR); KIA CORPORATION, Seoul (KR); INDUSTRY-ACADEMIC COOPERATION FOUNDATION, YONSEI UNIVERSITY, Seoul (KR)

( * ) Notice: Subject to any disclaimer, the term of this patent is extended or adjusted under 35 U.S.C. 154(b) by 373 days.

(21) Appl. No.: 17/846,627

(22) Filed: Jun. 22, 2022

(65) Prior Publication Data
US 2022/0406037 A1    Dec. 22, 2022

(30) Foreign Application Priority Data

Jun. 22, 2021    (KR) .......................... 10-2021-0080955

(51) Int. Cl.
*G06N 20/10*    (2019.01)
*G01S 17/89*    (2020.01)
(Continued)

(52) U.S. Cl.
CPC ............ *G06V 10/764* (2022.01); *G01S 17/89* (2013.01); *G01S 17/931* (2020.01); *G06N 20/10* (2019.01);
(Continued)

(58) Field of Classification Search
CPC ...... G06V 10/764; G06V 10/26; G06V 10/50; G06V 10/762; G06V 10/82; G06V 10/507;
(Continued)

(56) References Cited

U.S. PATENT DOCUMENTS 11,537,808 B2 * 12/2022 Crouch ................... G06F 18/22
2011/0149267 A1 * 6/2011 Welty ...................... G01S 17/00
356/4.01

(Continued)

OTHER PUBLICATIONS

J. Cheng, et al., "Robust Vehicle Detection using 3D Lidar under Complex Urban Environment," 2014 IEEE International Conference on Robotics & Automation (ICRA), May 31 through Jun. 7, 2014, pp. 691-696.

*Primary Examiner* — Sheela C Chawan
(74) *Attorney, Agent, or Firm* — Morgan, Lewis & Bockius LLP

(57) ABSTRACT

A method of classifying an object according to an embodiment includes extracting a first feature by transforming rectangular coordinates of points included in the box of the object, obtained from a point cloud acquired using a LiDAR sensor, into complex coordinates and performing Fast Fourier Transform (FFT) on the complex coordinates, obtaining an average and a standard deviation as a second feature, the average and the standard deviation being parameters of a Gaussian model for the points included in the box of the object, and classifying the type of object based on at least one of the first feature or the second feature.

20 Claims, 35 Drawing Sheets
(3 of 35 Drawing Sheet(s) Filed in Color)

(51) Int. Cl.
   *G01S 17/931* (2020.01)
   *G06V 10/26* (2022.01)
   *G06V 10/50* (2022.01)
   *G06V 10/762* (2022.01)
   *G06V 10/764* (2022.01)
   *G06V 10/82* (2022.01)
(52) U.S. Cl.
   CPC .............. *G06V 10/26* (2022.01); *G06V 10/50* (2022.01); *G06V 10/762* (2022.01); *G06V 10/82* (2022.01)
(58) Field of Classification Search
   CPC ....... G06V 20/56; G01S 17/89; G01S 17/931; G01S 7/4802; G01S 7/4808; G01S 7/4861; G06N 20/10; G06N 3/0499; G06N 3/09; G06N 3/08; G06F 18/24
   USPC .................................................. 382/100, 243
   See application file for complete search history.

(56) References Cited

U.S. PATENT DOCUMENTS

| 2013/0282208 A1* | 10/2013 | Mendez-Rodriguez ..................... G01S 17/933 701/16 |
| 2016/0259038 A1* | 9/2016 | Retterath .............. G01S 17/931 |
| 2022/0101494 A1* | 3/2022 | Mardani Korani .... G06V 10/82 |

* cited by examiner $x + yi$ fft $(x + yi)$ $x + zi$ $fft(x + zi)$ $x + yi$ $\text{fft}(x + yi)$ $x + zi$ $\text{fft}(x + zi)$ $x + yi$ $\text{fft}(x + yi)$ $x + zi$ fft $(x + zi)$ $x + yi$ fft $(x + yi)$ $x + zi$ fft $(x + zi)$

METHOD AND APPARATUS FOR CLASSIFYING OBJECT AND RECORDING MEDIUM STORING PROGRAM TO EXECUTE THE METHOD

This application claims the benefit of Korean Patent Application No. 10-2021-0080955, filed on Jun. 22, 2021, which is hereby incorporated by reference as if fully set forth herein.

TECHNICAL FIELD

Embodiments relate to a method and apparatus for classifying an object and a recording medium storing a program to execute the method.

BACKGROUND

Various technologies are being developed for autonomous driving of vehicles. For example, information on a target vehicle may be obtained using a light detection and ranging (LiDAR) sensor, and an autonomous driving function of a vehicle may be supported using the obtained information. However, if the type of object present in the vicinity of a vehicle equipped with a LiDAR sensor is not accurately classified (or recognized), it may be difficult to realize autonomous driving. Therefore, research with the goal of solving this problem is underway.

SUMMARY

Accordingly, embodiments are directed to a method and apparatus for classifying an object and a recording medium storing a program to execute the method that substantially obviate one or more problems due to limitations and disadvantages of the related art.

Embodiments provide an object classification method and apparatus capable of accurately classifying the type of object and a recording medium storing a program to execute the method.

However, the objects to be accomplished by the embodiments are not limited to the above-mentioned objects, and other objects not mentioned herein will be clearly understood by those skilled in the art from the following description.

A method of classifying an object according to an embodiment may include extracting a first feature by transforming rectangular coordinates of points included in the box of the object, obtained from a point cloud acquired using a LiDAR sensor, into complex coordinates and performing Fast Fourier Transform (FFT) on the complex coordinates, obtaining an average and a standard deviation as a second feature, the average and the standard deviation being parameters of a Gaussian model for the points included in the box of the object, and classifying the type of object based on at least one of the first feature or the second feature.

For example, the method may further include acquiring the point cloud, clustering the point cloud, and obtaining the box of the object by performing segmentation on the result of the clustering.

For example, the rectangular coordinates may include at least one of coordinates in a first plane based on a first axis and a second axis, the first axis being parallel to a first direction in which a host vehicle travels, the second axis being parallel to a second direction, or coordinates in a second plane based on a third axis and the first axis, the third axis being parallel to a third direction perpendicular to each of the first direction and the second direction, the third direction being a height direction of the host vehicle.

For example, the extracting a first feature may include transforming the rectangular coordinates of the points included in the box of the object into the complex coordinates and determining complex vectors of the points included in the box, obtained by performing FFT on the complex coordinates of the points included in the box, as the first feature.

For example, the extracting the first feature may further include determining a result of concatenation of a feature obtained for the first plane and a feature obtained for the second plane as the first feature.

For example, the extracting the second feature may include generating a histogram using the number of points included in the box of the object and determining the average and the standard deviation, obtained using the histogram, as the second feature.

For example, the points used to generate the histogram may be points present in the first plane.

For example, the classifying the type of object may be performed through a neural network classification method based on at least one of the first feature or the second feature.

For example, the classifying the type of object may be performed through a plurality of support vector machines based on at least one of the first feature or the second feature.

For example, the classifying the type of object may be performed through one multi-layer perceptron based on at least one of the first feature or the second feature.

For example, the type of object may include at least one of a road boundary, a vehicle, a bush, a tree, or a sign.

For example, the type of object may further a pedestrian, and the type of object may be classified as the pedestrian based on the first feature.

For example, the method may further include at least one of generating size/shape information on the box of the object as a third feature, generating a contour grid density of the box of the object as a fourth feature, or generating a covariance, an eigenvector, and an eigenvalue related to the box of the object as a fifth feature. The type of object may be classified based on at least one of the first feature or the second feature and at least one of the third feature, the fourth feature, or the fifth feature.

For example, the method may further include obtaining at least one of a contour of a Gaussian model in the first plane or a contour of a Gaussian model in the second plane as a sixth feature. The classifying the type of object may be further based on the sixth feature.

An apparatus for classifying an object according to another embodiment may include a first feature extraction module configured to extract a first feature by transforming rectangular coordinates of points included in the box of the object, obtained from a point cloud acquired through a LiDAR sensor, into complex coordinates and performing Fast Fourier Transform (FFT) on the complex coordinates, a second feature extraction module configured to obtain an average and a standard deviation and to output the average and the standard deviation as a second feature, the average and the standard deviation being parameters of a Gaussian model for the points included in the box of the object, and an object classifier configured to classify the type of object based on at least one of the first feature or the second feature.

For example, the apparatus may further include a point acquisition module configured to acquire the point cloud, a clustering module configured to cluster the point cloud, and a segmentation module configured to obtain the box of the object by performing segmentation on a result of the clustering.

For example, the object classifier may include a neural network classifier configured to receive at least one of the first feature or the second feature as input and to output the type of object.

For example, the neural network classifier may include a plurality of support vector machines configured to classify the type of object based on at least one of the first feature or the second feature.

For example, the plurality of support vector machines may include a first support vector machine configured to determine whether the type of object is a road boundary and a second support vector machine configured to determine whether the type of object is a vehicle or a bush.

According to still another embodiment, a non-transitory computer-readable recording medium may store a program which, when executed by a processor, causes the processor to perform a method of classifying an object. The method may include extracting a first feature by transforming rectangular coordinates of points included in the box of the object, obtained from a point cloud acquired through a LiDAR sensor, into complex coordinates and performing Fast Fourier Transform (FFT) on the complex coordinates, a function of obtaining an average and a standard deviation as a second feature, the average and the standard deviation being parameters of a Gaussian model for the points included in the box of the object, and a function of classifying the type of object based on at least one of the first feature or the second feature. The recording medium may be read by a computer system.

BRIEF DESCRIPTION OF THE DRAWINGS

The patent or patent application file contains at least one drawing executed in color. Copies of this patent or patent application publication with color drawing(s) will be provided by the Office upon request and payment of the necessary fee.

The accompanying drawings, which are included to provide a further understanding of the invention and are incorporated in and constitute a part of this application, illustrate embodiment(s) of the invention and together with the description serve to explain the principle of the invention. In the drawings.

DETAILED DESCRIPTION OF THE INVENTION

The present disclosure will now be described more fully hereinafter with reference to the accompanying drawings, in which various embodiments are shown. The examples, however, may be embodied in many different forms, and should not be construed as being limited to the embodiments set forth herein. Rather, these embodiments are provided so that this disclosure will be more thorough and complete, and will more fully convey the scope of the disclosure to those skilled in the art.

It will be understood that when an element is referred to as being "on" or "under" another element, it may be directly on/under the element, or one or more intervening elements may also be present.

When an element is referred to as being "on" or "under", "under the element" as well as "on the element" may be included based on the element.

In addition, relational terms, such as "first", "second", "on/upper part/above" and "under/lower part/below", are used only to distinguish between one subject or element and another subject or element, without necessarily requiring or involving any physical or logical relationship or sequence between the subjects or elements.

Hereinafter, a method 100 and apparatus 300 for classifying an object and a recording medium storing a program to execute the method according to embodiments will be described with reference to the accompanying drawings. The method 100 and apparatus 300 for classifying an object and the recording medium storing a program to execute the method will be described using the Cartesian coordinate system (x-axis, y-axis, z-axis) for convenience of description, but may also be described using other coordinate systems.

Figure 1:
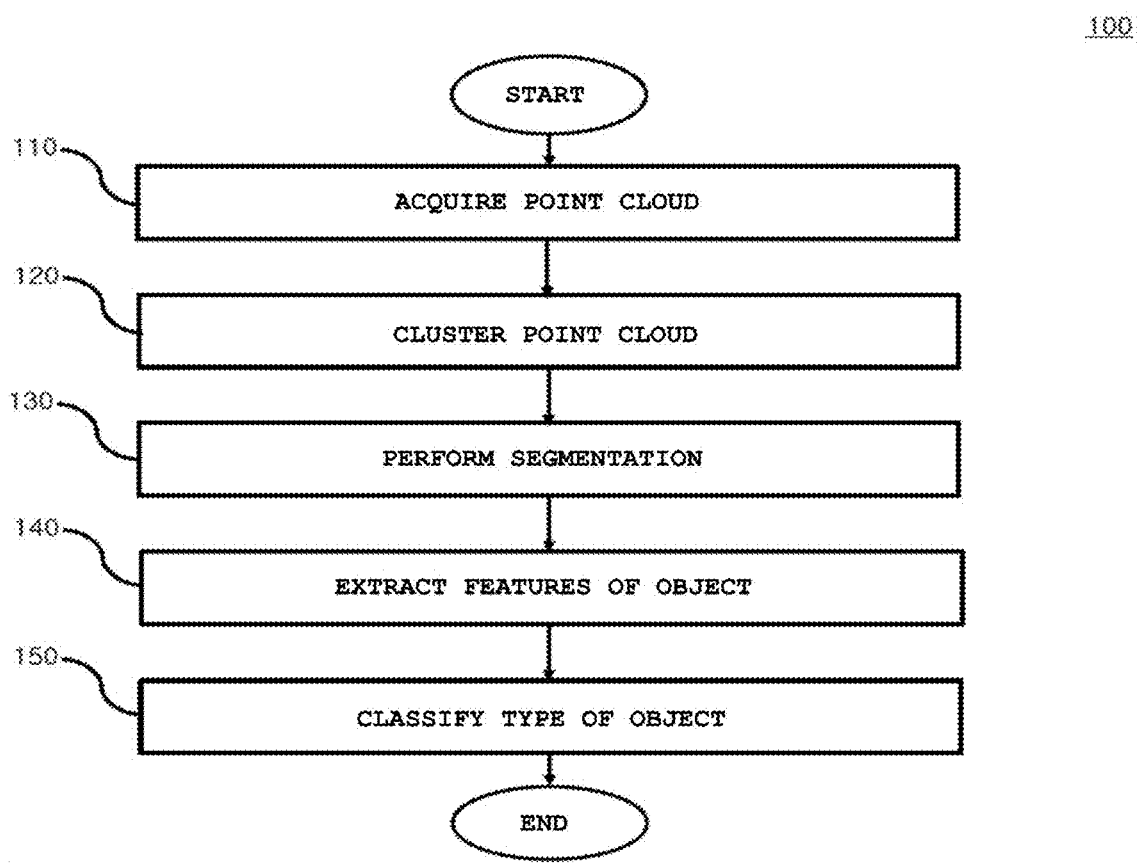
FIG. 1 is a flowchart for explaining an object classification method according to an embodiment.

FIG. 1 is a flowchart for explaining an object classification method 100 according to an embodiment.

Referring to FIG. 1, in the object classification method 100 according to the embodiment, a plurality of points (a point cloud or point data) associated with an object is acquired by a light detection and ranging (LiDAR) sensor (step 110). The point cloud acquired in step 110 is a three-dimensional (3D) point cloud.

The LiDAR sensor may be provided in a plural number, and the plurality of LiDAR sensors may be mounted at various positions on a vehicle (hereinafter referred to as a "host vehicle"). For example, the LiDAR sensors may be disposed at various positions on the host vehicle, such as at the roof, the front side portions, and the rear side portions of the host vehicle. However, the embodiments are not limited to any specific position at which the LiDAR sensor is disposed in the host vehicle or to any specific number of LiDAR sensors.

For example, the LiDAR sensor may fire (radiate or emit) a single circular laser pulse (or laser beam) having a wavelength of 905 nm to 1550 nm to objects, and may measure the time taken for the laser pulse reflected from an object present within a measurement range to return, thereby sensing information on the object, for example, the distance from the LiDAR sensor to the object, the orientation of the object, the speed of the object, the temperature of the object, the material distribution of the object, and the concentration characteristics of the object. Here, the object may be, for example, a vehicle (or another vehicle), a person, or an obstacle present outside the host vehicle equipped with the LiDAR sensor. However, the embodiments are not limited to any specific type of object.

After step 110, clustering (or grouping) is performed on the point cloud (step 120). Here, the term "clustering" refers to a process of classifying the points into groups such that each group includes points associated with the same object. For example, clustering may be performed on the point cloud using a grid-based clustering method or a density-based clustering method. The result of sensing by the LiDAR sensor shows a plurality of points, each of which contains only information about position (or coordinates). In this case, the points may be grouped by object, and a cluster may be generated as a result of the grouping.

After step 120, segmentation may be performed on the result of the clustering (step 130). By performing segmentation, information about the contour, width, length, position, or heading of the result of the clustering may be extracted, and the extracted information may be used to determine the box of the object.

Hereinafter, steps 140 and 150 will be described with reference to FIG. 1, but the embodiments are not limited thereto. That is, steps 140 and 150 according to the embodiment are not limited to any specific operation of each of steps 110 to 130 shown in FIG. 1.

After step 130, at least one of the first feature or the second feature of the point included in the box of the object is extracted (step 140).

After step 140, the type of object may be classified (or recognized) using the features extracted in step 140 (step 150).

The number of types of object that can be classified by the object classification method 100 according to the embodiment may be 3 or greater. For example, the type of object that can be classified may include at least one of a road boundary, a vehicle, a bush, a tree, or a sign. Here, the vehicle may be a passenger car or a large vehicle. Also, the type of object may further include a pedestrian.

Figure 2:
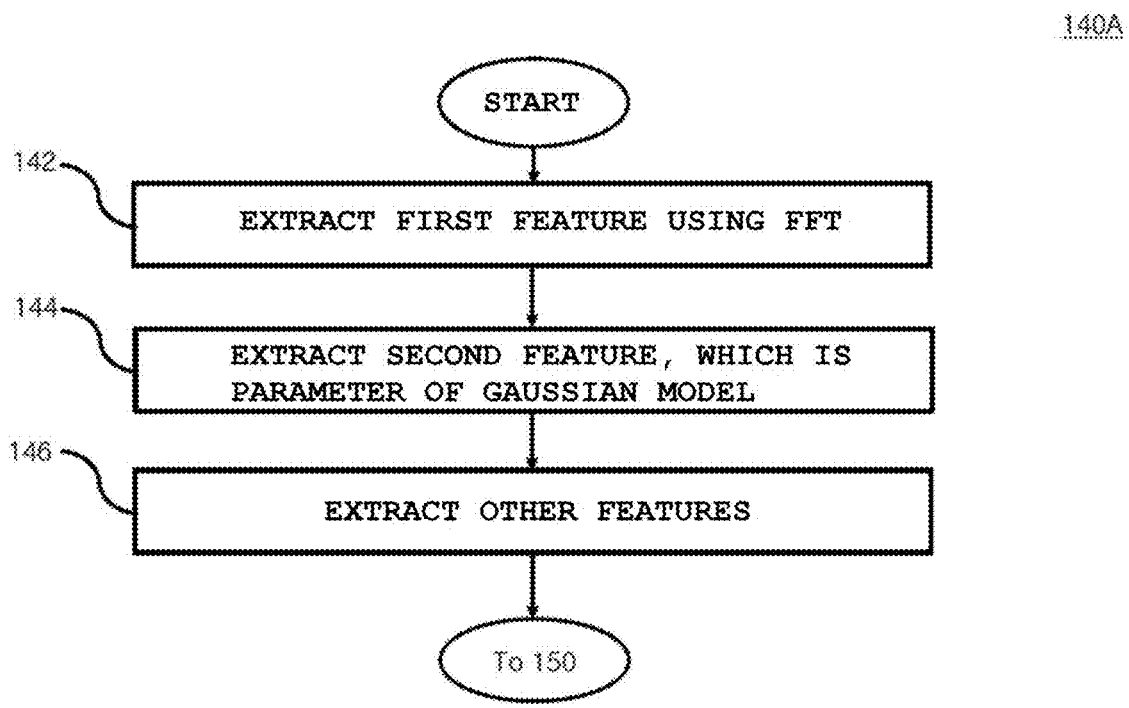
FIG. 2 is a flowchart for explaining an embodiment of step 140 shown in FIG. 1.

FIG. 2 is a flowchart for explaining an embodiment 140A of step 140 shown in FIG. 1.

The first feature may include a result obtained by transforming the rectangular coordinates of each of the points included in the box of the object into complex coordinates and then performing Fast Fourier Transform (FFT) on the complex coordinates. In this way, the first feature may be extracted using the FFT (step 142). Here, the FFT may be a two-dimensional FFT.

The second feature may include an average and a standard deviation, which are parameters of a Gaussian model for the points included in the box of the object. In this way, the average and the standard deviation, which are parameters of the Gaussian model, may be extracted as the second feature (step 144).

Also, according to the embodiment, at least one of third to sixth features may be extracted as "other features", in addition to the first and second features (step 146). For example, at least one of the other features may be extracted from the basic attributes of the box of the object or the coordinates of each point. This will be described in detail later with reference to FIG. 21.

Although it is illustrated in FIG. 2 that step 144 is performed after step 142 and step 146 is performed after step 144, the embodiments are not limited thereto. That is, according to another embodiment, steps 142 to 146 may be performed in any order.

Hereinafter, according to the embodiment, each of the first to sixth features may be extracted as follows.

First, the first feature may be extracted as follows.

Figure 3:
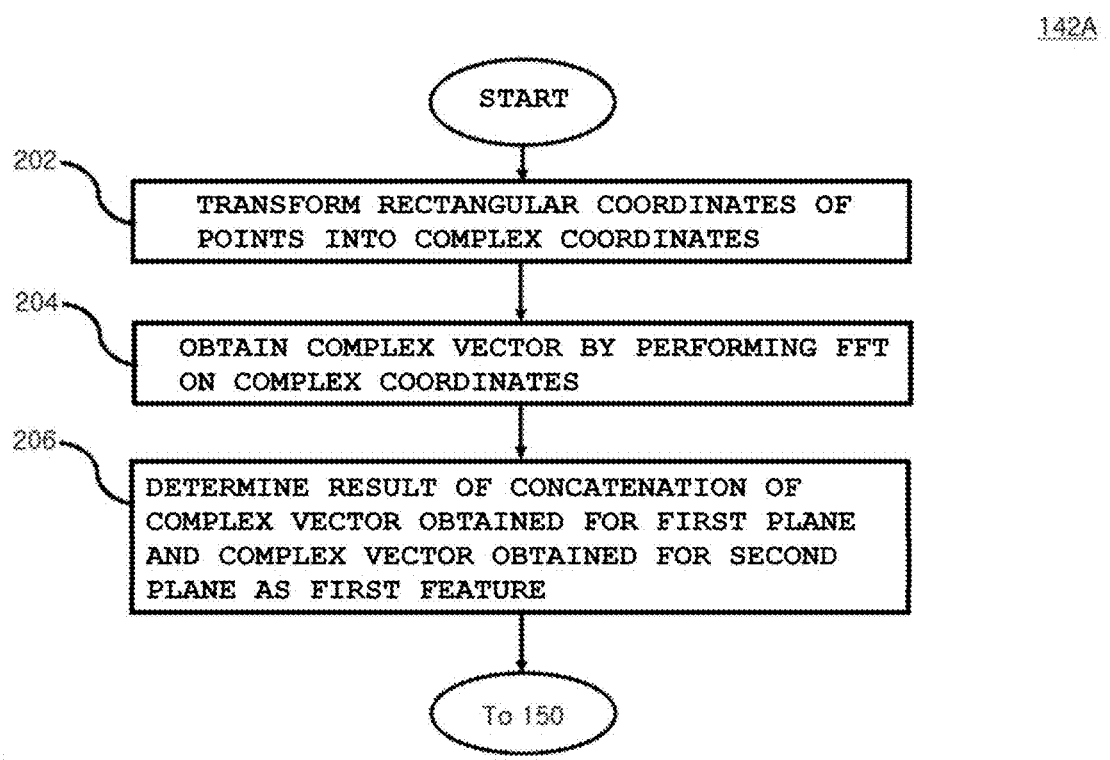
FIG. 3 is a flowchart for explaining an embodiment of step 142 shown in FIG. 2.

FIG. 3 is a flowchart for explaining an embodiment 142A of step 142 shown in FIG. 2.

Since the point cloud acquired in step 110 is a three-dimensional (3D) point cloud, each of the points included in the box of the object acquired in step 130 has x-axis, y-axis, and z-axis coordinates.

Hereinafter, it will be described that a first axis corresponds to the x-axis, i.e. an axis that is parallel to a first direction in which the host vehicle travels, that a second axis corresponds to the y-axis, i.e. an axis that is parallel to a second direction, which is perpendicular to the first direction and to a third direction, and that a third axis corresponds to the z-axis, i.e. an axis that is parallel to the third direction, which is the height direction of the host vehicle. However, the embodiments are not limited thereto. The plane formed by the first axis and the second axis will be referred to as a "first plane", and the plane formed by the first axis and the third axis will be referred to as a "second plane". For example, an xy plane may correspond to the first plane, and an xz plane may correspond to the second plane.

The aforementioned rectangular coordinates may include at least one of coordinates in the xy plane or coordinates in the xz plane. That is, step 142A shown in FIG. 3 may be performed in at least one of the xy plane or the xz plane. Hereinafter, although step 142A will be described as being performed in each of the xy plane and the xz plane, the embodiments are not limited thereto.

First, step 142A shown in FIG. 3 is performed as follows using the rectangular coordinates in the xy plane, which is the first plane, thereby extracting a part (hereinafter referred to as a "1-1$^{st}$ feature") of the first feature in the first plane.

The x-axis and y-axis coordinates (x, y), which are the rectangular coordinates in the xy plane of the points included in the box of the object, may be converted into complex coordinates, as shown in Equation 1 below (step 202).

$$x+jy \qquad \text{[Equation 1]}$$

Here, "x" represents the real part of the complex coordinates, and "y" represents the imaginary part of the complex coordinates.

After step 202, FFT is performed on the complex coordinates of each of the points included in the box to obtain the complex vector of each of the points included in the box, and the complex vector is determined as the 1-1$^{st}$ feature (step 204).

For example, the "N" points included in the box of the object form an array S as shown in Equation 2 below, and the rectangular coordinates in the xyz plane of the i$^{th}$ point pi belonging to the array S are calculated as shown in Equation 3 below. In this case, the complex coordinates ($C_{XY,i}$) of the point pi are expressed as in Equation 1 above.

$$S=\{p_1, p_2, \ldots, p_N\} \qquad \text{[Equation 2]}$$

$$p_i=[x_i \ y_i \ z_i] \qquad \text{[Equation 3]}$$

If FFT is performed on the complex coordinates of the "N" points included in the box, the complex vector $F_{XY}$ may be obtained as the 1-1$^{st}$ feature, as shown in Equation 4 below.

$$F_{XY} = \begin{bmatrix} F_{XY,1} \\ F_{XY,2} \\ F_{XY,3} \\ \cdot \\ \cdot \\ \cdot \\ F_{XY,k} \end{bmatrix} = \begin{bmatrix} W^0 & W^0 & W^0 & \ldots & W^0 \\ W^0 & W^1 & W^2 & \ldots & W^N \\ W^0 & W^2 & W^4 & \ldots & W^{2N} \\ \cdot & \cdot & \cdot & \ldots & \cdot \\ \cdot & \cdot & \cdot & \ldots & \cdot \\ \cdot & \cdot & \cdot & \ldots & \cdot \\ W^0 & W^k & W^{2k} & \ldots & W^{kN} \end{bmatrix} \begin{bmatrix} c_{XY,1} \\ c_{XY,2} \\ c_{XY,3} \\ \cdot \\ \cdot \\ \cdot \\ c_{XY,N} \end{bmatrix} \qquad \text{[Equation 4]}$$

Here, "W" may be expressed as in Equation 5 below.

$$W=\exp(-2\pi j/N) \qquad \text{[Equation 5]}$$

In Equation 5, "k", which is a dimension, is a multiple of 2, and may be experimentally obtained. For example, "k" may be 16, but the embodiments are not limited thereto.

Next, step 142A shown in FIG. 3 is performed as follows using the rectangular coordinates in the xz plane, which is the second plane, thereby extracting another part (hereinafter referred to as a "1-2$^{nd}$ feature") of the first feature in the second plane. The 1-2$^{nd}$ feature may be extracted by the same method as the 1-1$^{st}$ feature.

The x-axis and z-axis coordinates (x, z), which are the rectangular coordinates in the xz plane of the points included in the box of the object shown in FIG. 3, may be converted into complex coordinates, as shown in Equation 6 below (step 202). That is, in step 202, the rectangular coordinate system is moved to the complex plane.

$$x+jz \qquad \text{[Equation 6]}$$

Here, "x" represents the real part of the complex coordinates, and "z" represents the imaginary part of the complex coordinates.

After step 202, FFT is performed on the complex coordinates of each of the points included in the box to obtain the complex vector of each of the points included in the box, and the complex vector is determined as the 1-2$^{nd}$ feature (step 204).

For example, the "N" points included in the box of the object form an array S as shown in Equation 2 above, and the rectangular coordinates in the xyz plane of the i$^{th}$ point pi belonging to the array S are calculated as shown in Equation 3 above. In this case, the complex coordinates ($C_{XZ,i}$) of the point pi are expressed as in Equation 6 above.

If FFT is performed on the complex coordinates of the "N" points included in the box, the complex vector $F_{XZ}$ may be obtained as the 1-2$^{nd}$ feature, as shown in Equation 7 below.

$$F_{XZ} = \begin{bmatrix} F_{XZ,1} \\ F_{XZ,2} \\ F_{XZ,3} \\ \cdot \\ \cdot \\ \cdot \\ F_{XZ,k} \end{bmatrix} = \begin{bmatrix} W^0 & W^0 & W^0 & \ldots & W^0 \\ W^0 & W^1 & W^2 & \ldots & W^N \\ W^0 & W^2 & W^4 & \ldots & W^{2N} \\ \cdot & \cdot & \cdot & \ldots & \cdot \\ \cdot & \cdot & \cdot & \ldots & \cdot \\ \cdot & \cdot & \cdot & \ldots & \cdot \\ W^0 & W^k & W^{2k} & \ldots & W^{kN} \end{bmatrix} \begin{bmatrix} c_{XZ,1} \\ c_{XZ,2} \\ c_{XZ,3} \\ \cdot \\ \cdot \\ \cdot \\ c_{XZ,N} \end{bmatrix} \qquad \text{[Equation 7]}$$

Here, "W" may be expressed as in Equation 5 above.

After step 204, the 1-1$^{st}$ feature obtained for the first plane and the 1-2$^{nd}$ feature obtained for the second plane may be concatenated so as to be determined as one first feature (step 206). Here, the reason for concatenating the 1-1$^{st}$ feature F(x+yi) and the 1-2$^{nd}$ feature F(x+zi) is to transform the two-dimensional 1-1$^{st}$ feature and the two-dimensional 1-2$^{nd}$ feature into a feature suitable for a three-dimensional shape, as shown in Equation 8 below.

$$\{x,y,z\} \rightarrow \{x+yi, x+zi\} \rightarrow F(x+yi), F(x+zi) \qquad \text{[Equation 8]}$$

Hereinafter, according to the embodiment, the 1-1$^{st}$ and 1-2$^{nd}$ features may be extracted with respect to each type of object as follows.

Figure 4:
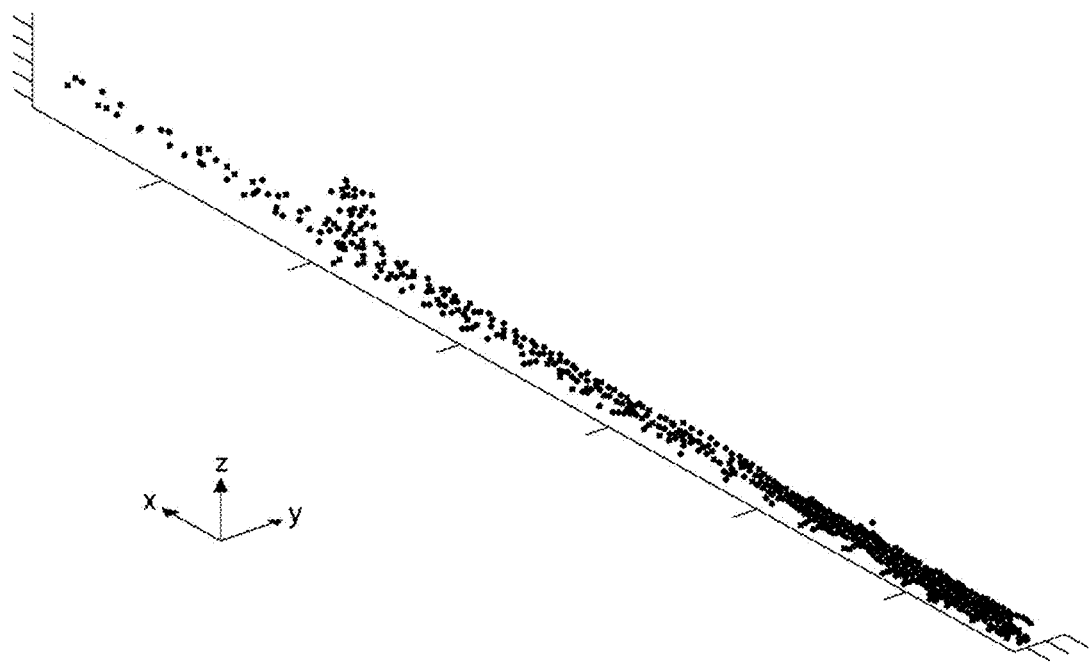
FIG. 4 shows distribution of points included in a box of an object when the type of object is a road boundary.
Figure 5A:
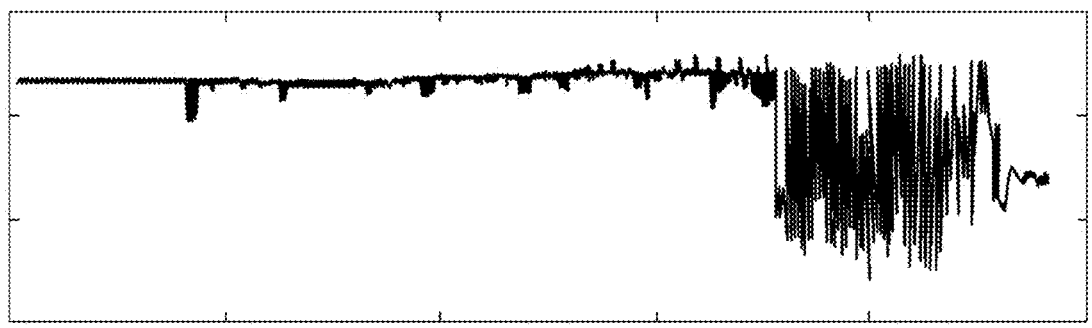
FIGS. 5A and 5B respectively show complex coordinates and a $1\text{-}1^{st}$ feature in a first plane of the points shown in FIG. 4.
Figure 5B:
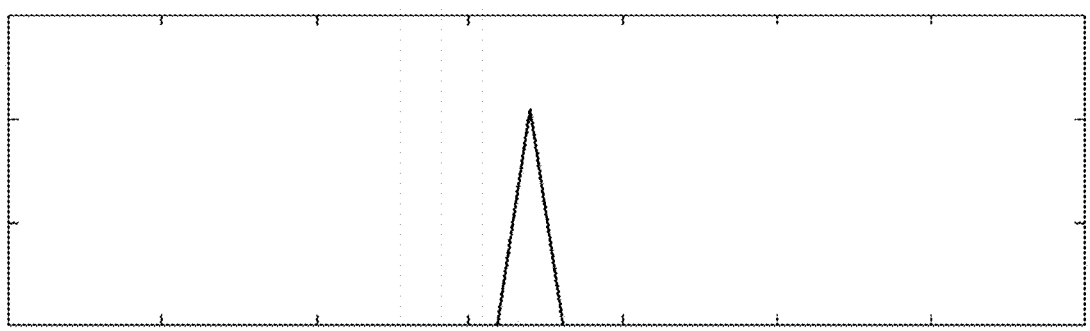
Figure 6A:
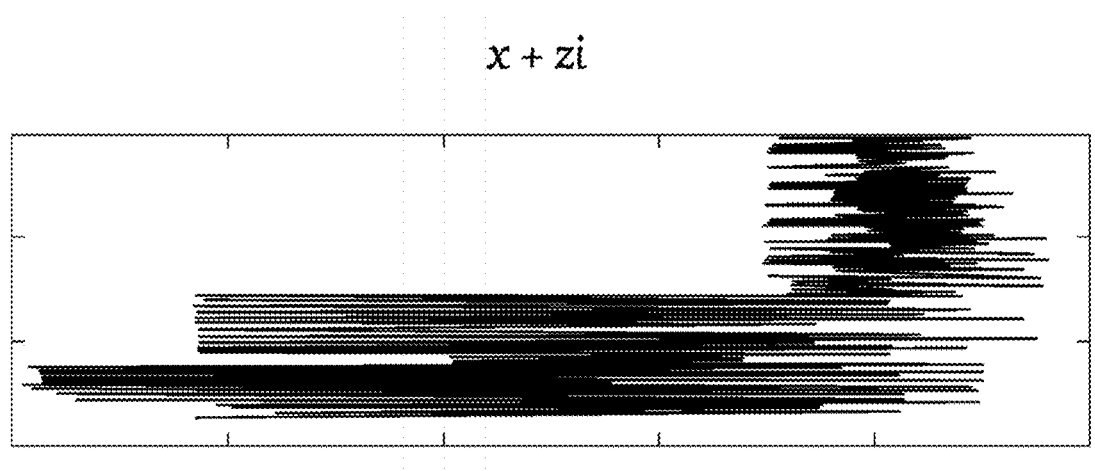
FIGS. 6B and 6B respectively show complex coordinates and a $1\text{-}2^{nd}$ feature in a second plane of the points shown in FIG. 4.
Figure 6B:
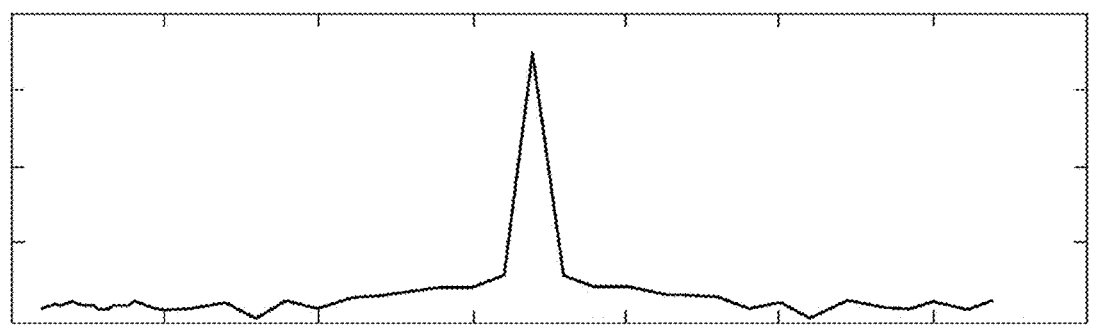

FIG. 4 shows distribution of the points included in the box of the object when the type of object is a road boundary. FIG. 5A shows the complex coordinates in the first plane of the points shown in FIG. 4, and FIG. 5B shows the 1-1$^{st}$ feature in the first plane of the points shown in FIG. 4. FIG. 6A shows the complex coordinates in the second plane of the points shown in FIG. 4, and FIG. 6B shows the 1-2$^{nd}$ feature in the second plane of the points shown in FIG. 4.

For example, the rectangular coordinates in the first plane of each of the points shown in FIG. 4 are moved to the complex plane, as shown in FIG. 5A (step 202). Then, when "k" is 16, FFT is performed on the complex coordinates (x+yi) of each of the points shown in FIG. 5A in the first plane included in the box to obtain the complex vector fft(x+yi) of each of the points included in the box, as illustrated in FIG. 5B, and the complex vector may be determined as the 1-1$^{st}$ feature (step 204).

In addition, the rectangular coordinates in the second plane of each of the points shown in FIG. 4 are moved to the complex plane, as shown in FIG. 6A (step 202). Then, when "k" is 16, FFT is performed on the complex coordinates (x+zi) of each of the points shown in FIG. 6A in the second plane included in the box to obtain the complex vector fft(x+zi) of each of the points included in the box, as illustrated in FIG. 6B, and the complex vector may be determined as the 1-2$^{nd}$ feature (step 204).

Figure 7:
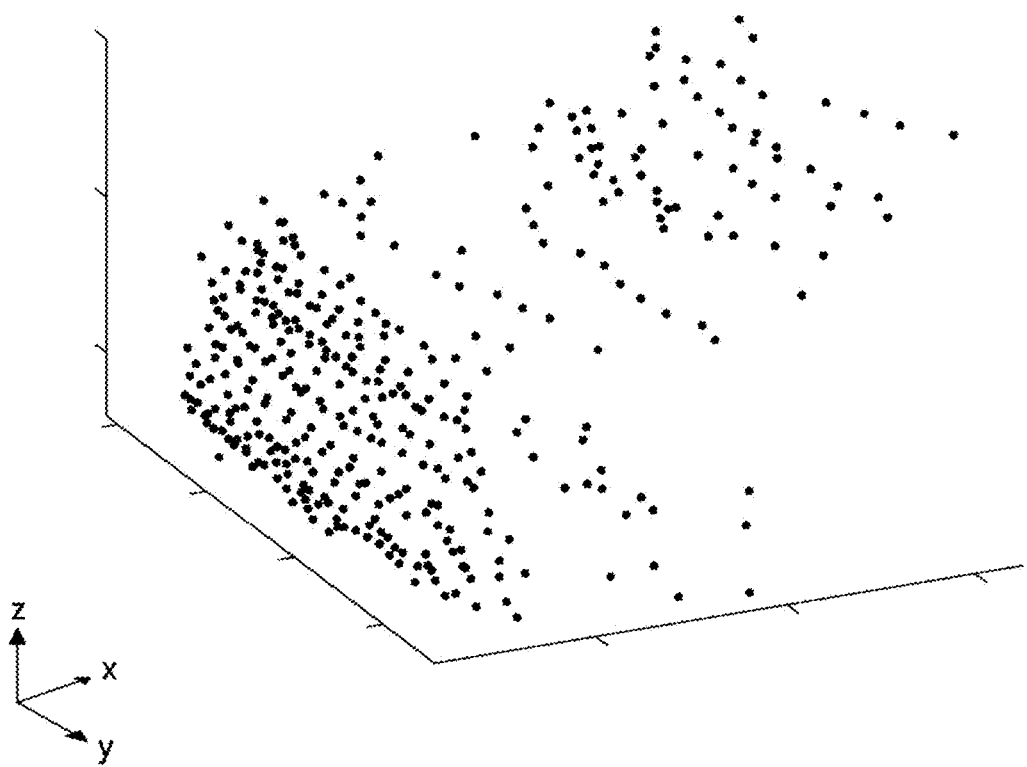
FIG. 7 shows distribution of points included in a box of an object when the type of object is a passenger car.
Figure 8A:
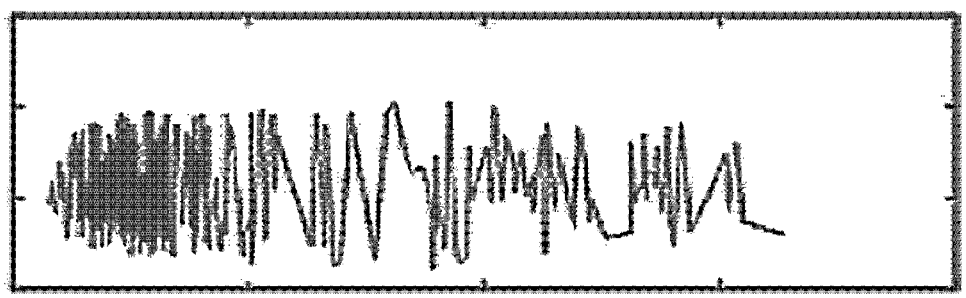
FIGS. 8A and 8B respectively show complex coordinates and a $1\text{-}1^{st}$ feature in a first plane of the points shown in FIG. 7.
Figure 8B:
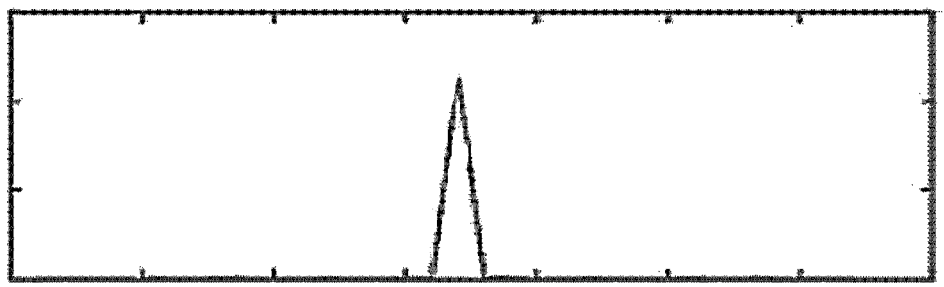
Figure 9A:
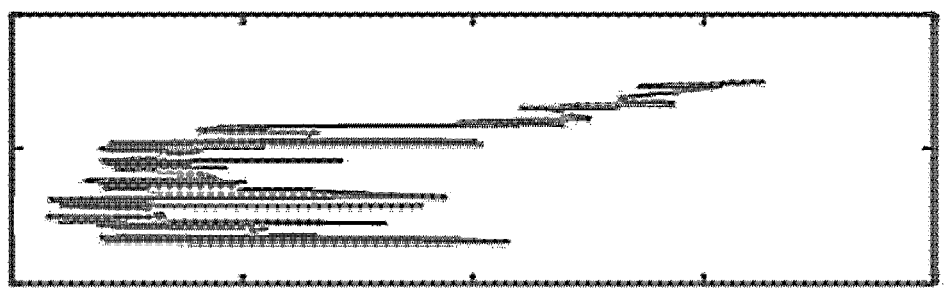
FIGS. 9A and 9B respectively show complex coordinates and a $1\text{-}2^{nd}$ feature in a second plane of the points shown in FIG. 7.
Figure 9B:
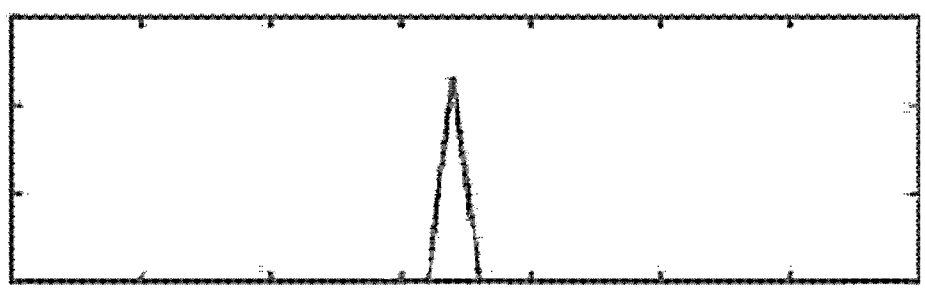

FIG. 7 shows distribution of the points included in the box of the object when the type of object is a passenger car. FIG. 8A shows the complex coordinates in the first plane of the points shown in FIG. 7, and FIG. 8B shows the 1-1$^{st}$ feature in the first plane of the points shown in FIG. 7. FIG. 9A shows the complex coordinates in the second plane of the points shown in FIG. 7, and FIG. 9B shows the 1-2$^{nd}$ feature in the second plane of the points shown in FIG. 7.

For example, the rectangular coordinates in the first plane of each of the points shown in FIG. 7 are moved to the complex plane, as shown in FIG. 8A (step 202). Then, when "k" is 16, FFT is performed on the complex coordinates (x+yi) of each of the points shown in FIG. 8A in the first plane included in the box to obtain the complex vector fft(x+yi) of each of the points included in the box, as illustrated in FIG. 8B, and the complex vector may be determined as the 1-1$^{st}$ feature (step 204).

In addition, the rectangular coordinates in the second plane of each of the points shown in FIG. 7 are moved to the complex plane, as shown in FIG. 9A (step 202). Then, when "k" is 16, FFT is performed on the complex coordinates (x+zi) of each of the points shown in FIG. 9A in the second plane included in the box to obtain the complex vector fft(x+zi) of each of the points included in the box, as illustrated in FIG. 9B, and the complex vector may be determined as the 1-2$^{nd}$ feature (step 204).

Figure 10:
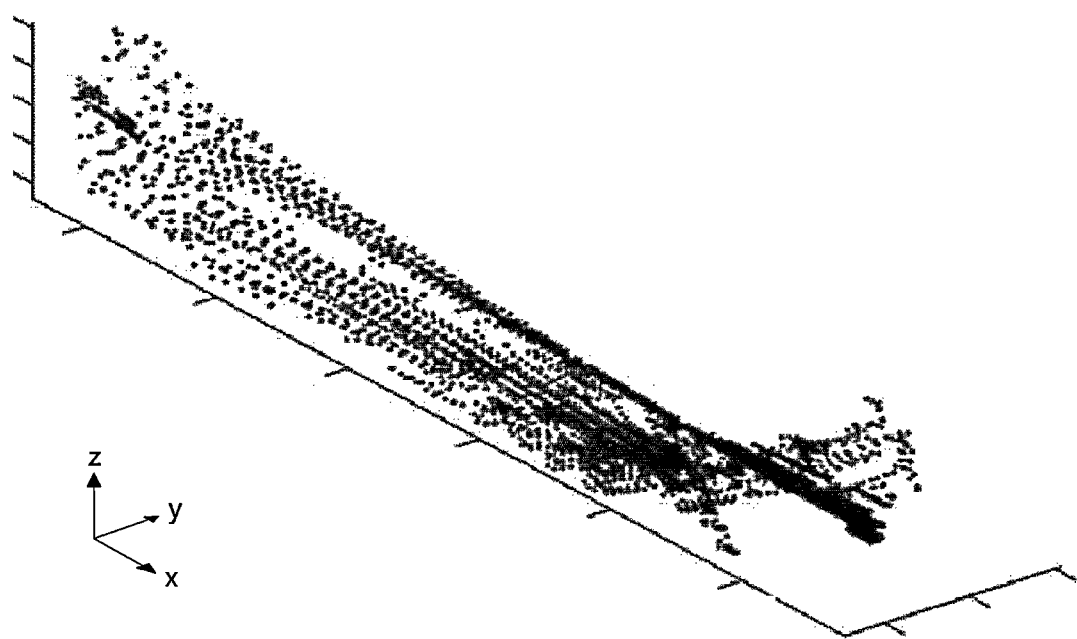
FIG. 10 shows distribution of points included in a box of an object when the type of object is a large vehicle.
Figure 11A:
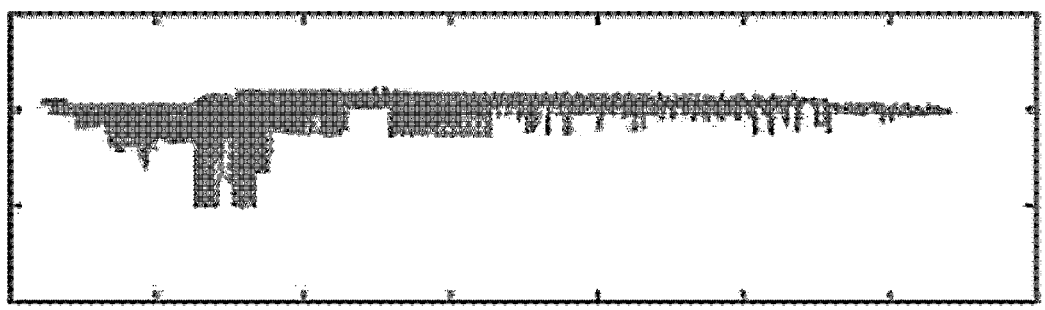
FIGS. 11A and 11B respectively show complex coordinates and a $1\text{-}1^{st}$ feature in a first plane of the points shown in FIG. 10.
Figure 11B:
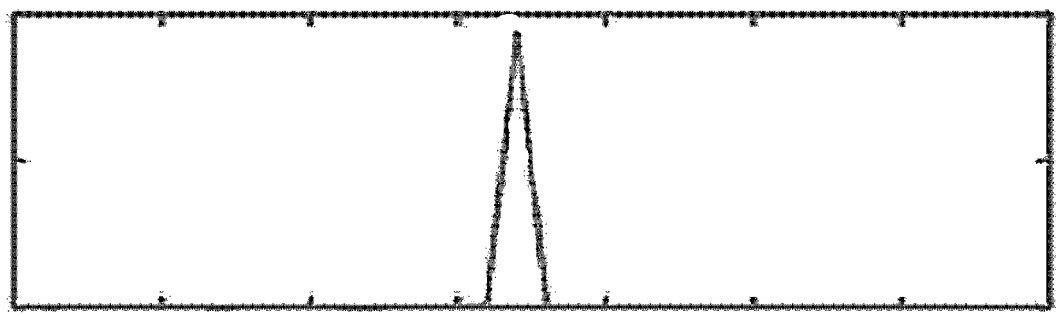
Figure 12A:
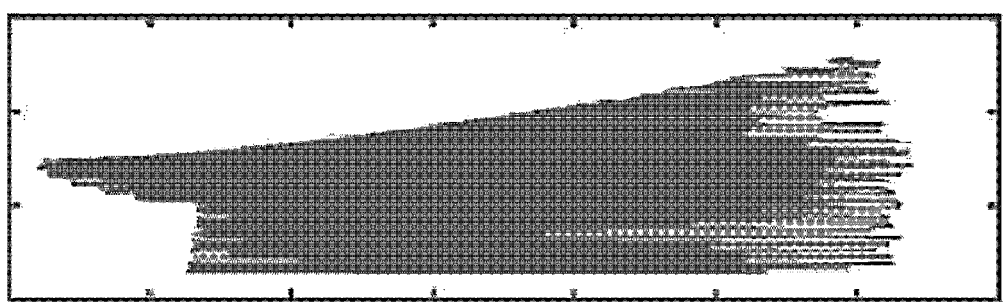
FIGS. 12A and 12B respectively show complex coordinates and a $1\text{-}2^{nd}$ feature in a second plane of the points shown in FIG. 10.
Figure 12B:
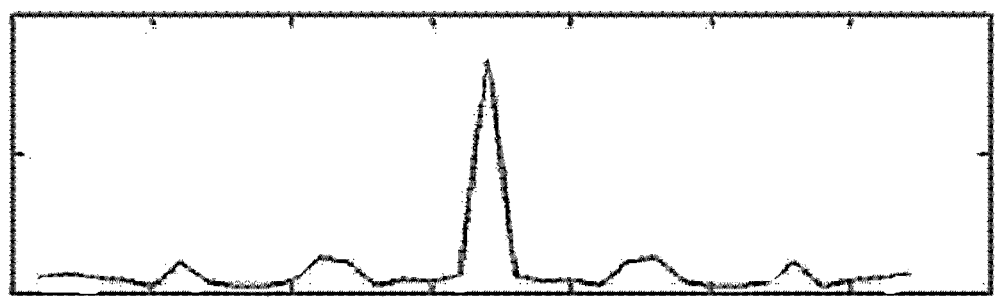

FIG. 10 shows distribution of the points included in the box of the object when the type of object is a large vehicle. FIG. 11A shows the complex coordinates in the first plane of the points shown in FIG. 10, and FIG. 11B shows the 1-1$^{st}$ feature in the first plane of the points shown in FIG. 10. FIG. 12A shows the complex coordinates in the second plane of the points shown in FIG. 10, and FIG. 12B shows the 1-2$^{nd}$ feature in the second plane of the points shown in FIG. 10.

For example, the rectangular coordinates in the first plane of each of the points shown in FIG. 10 are moved to the complex plane, as shown in FIG. 11A (step 202). Then, when "k" is 16, FFT is performed on the complex coordinates (x+yi) of each of the points shown in FIG. 11A in the first plane included in the box to obtain the complex vector fft(x+yi) of each of the points included in the box, as illustrated in FIG. 11B, and the complex vector may be determined to be the 1-1$^{st}$ feature (step 204).

In addition, the rectangular coordinates in the second plane of each of the points shown in FIG. 10 are moved to the complex plane, as shown in FIG. 12A (step 202). Then, when "k" is 16, FFT is performed on the complex coordinates (x+zi) of each of the points shown in FIG. 12A in the second plane included in the box to obtain the complex vector fft(x+zi) of each of the points included in the box, as illustrated in FIG. 12B, and the complex vector may be determined to be the 1-2$^{nd}$ feature (step 204).

Figure 13:
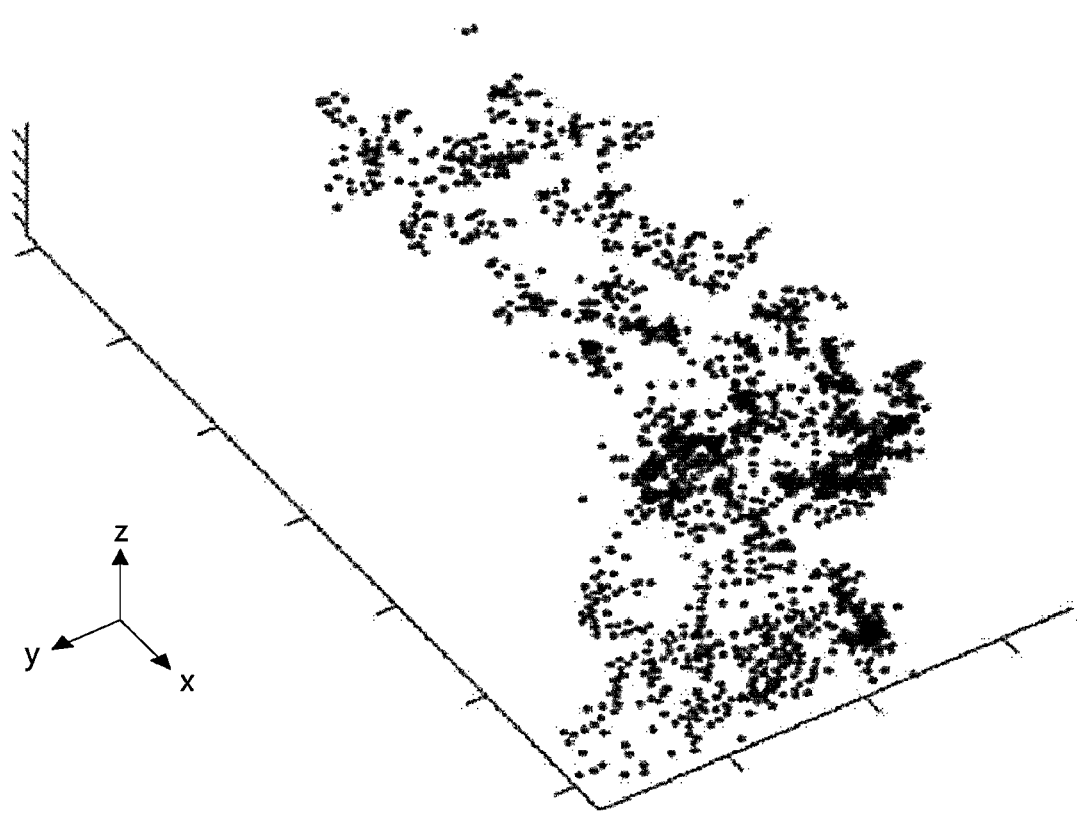
FIG. 13 shows distribution of points included in a box of an object when the type of object is an object other than a road boundary or a vehicle.
Figure 14A:
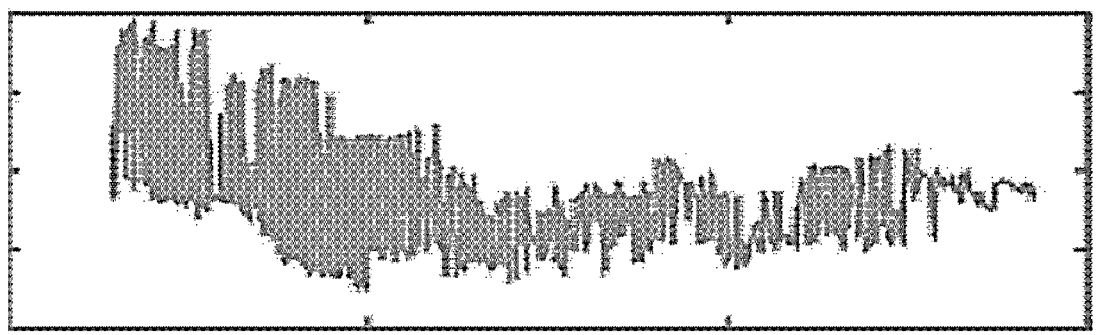
FIGS. 14A and 14B respectively show complex coordinates and a $1\text{-}1^{st}$ feature in a first plane of the points shown in FIG. 13.
Figure 14B:
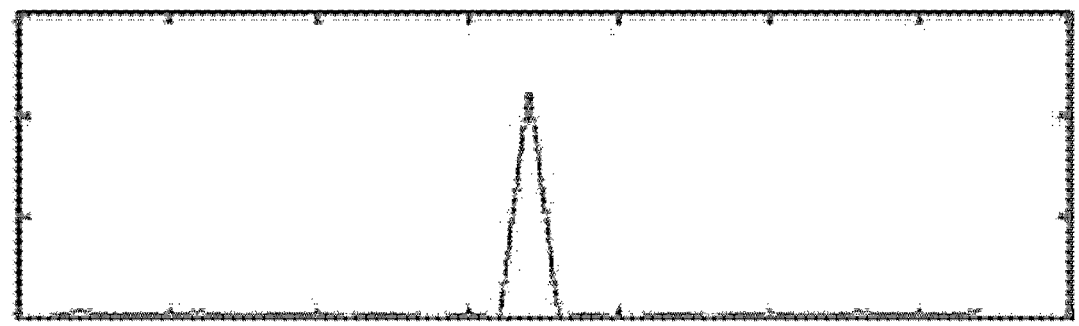
Figure 15A:
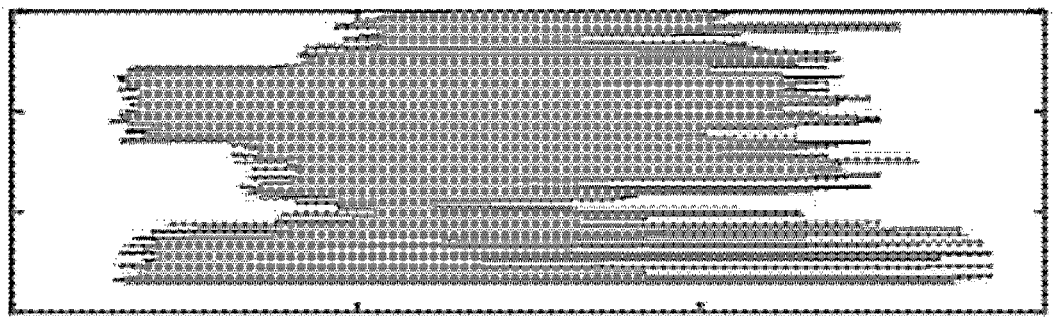
FIGS. 15A and 15B respectively show complex coordinates and a $1\text{-}2^{nd}$ feature in a second plane of the points shown in FIG. 13.
Figure 15B:
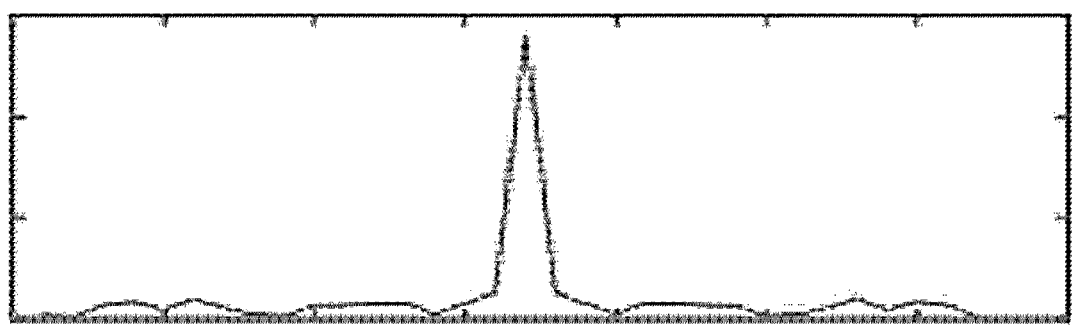

FIG. 13 shows distribution of the points included in the box of the object when the type of object is an object other than a road boundary or a vehicle (e.g. a bush). FIG. 14A shows the complex coordinates in the first plane of the points shown in FIG. 13, and FIG. 14B shows the 1-1$^{st}$ feature in the first plane of the points shown in FIG. 13. FIG. 15A shows the complex coordinates in the second plane of the points shown in FIG. 13, and FIG. 15B shows the 1-2$^{nd}$ feature in the second plane of the points shown in FIG. 13.

For example, the rectangular coordinates in the first plane of each of the points shown in FIG. 13 are moved to the complex plane, as shown in FIG. 14A (step 202). Then, when "k" is 16, FFT is performed on the complex coordinates (x+yi) of each of the points shown in FIG. 14A in the first plane included in the box to obtain the complex vector fft(x+yi) of each of the points included in the box, as illustrated in FIG. 14B, and the complex vector may be determined to be the 1-1$^{st}$ feature (step 204).

In addition, the rectangular coordinates in the second plane of each of the points shown in FIG. 13 are moved to the complex plane, as shown in FIG. 15A (step 202). Then, when "k" is 16, FFT is performed on the complex coordinates (x+zi) of each of the points shown in FIG. 15A in the second plane included in the box to obtain the complex vector fft(x+zi) of each of the points included in the box, as illustrated in FIG. 15B, and the complex vector may be determined to be the 1-2$^{nd}$ feature (step 204).

FIG. 16 shows the first feature acquired using the points included in the box of the object when the type of object is a pedestrian.

Figure 16A:
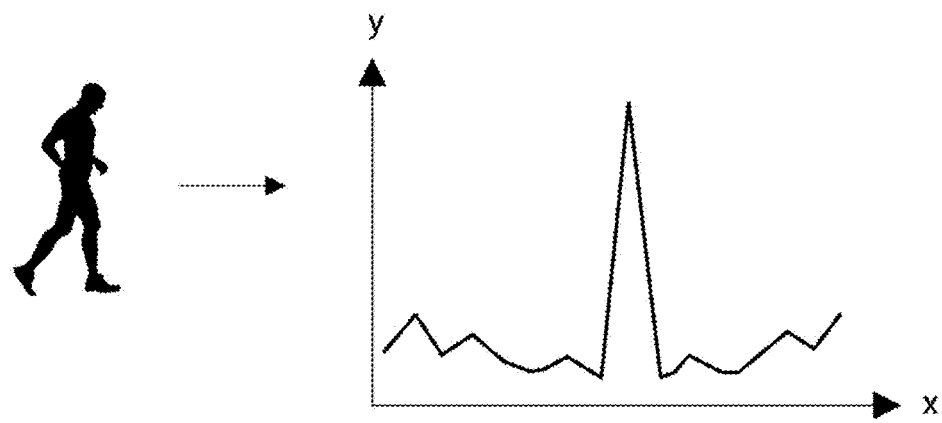
FIGS. 16A and 16B show a first feature acquired using points included in a box of an object when the type of object is a pedestrian.
Figure 16B:
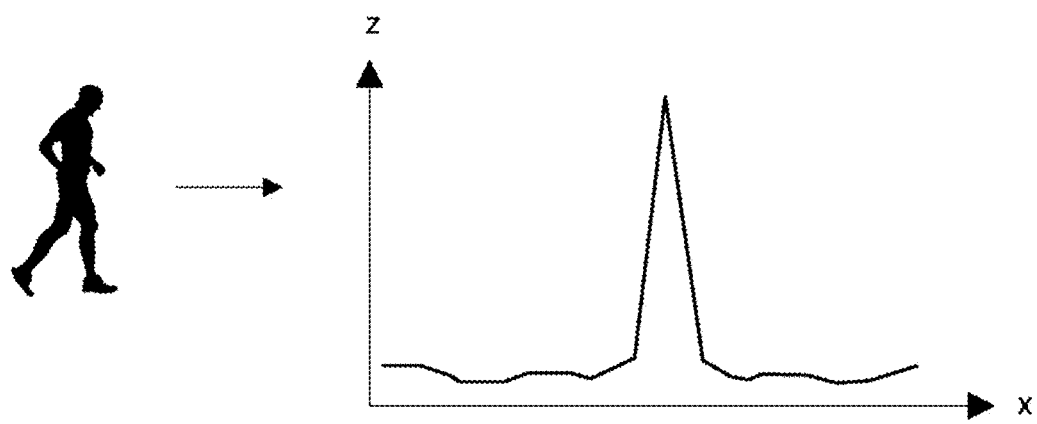

When the type of object is a pedestrian, the 1-1$^{st}$ feature may be obtained as shown in FIG. 16B, and the 1-2$^{nd}$ feature may be obtained as shown in FIG. 16B by performing step 142A described above.

Next, the second feature may be extracted as follows.

Figure 17:
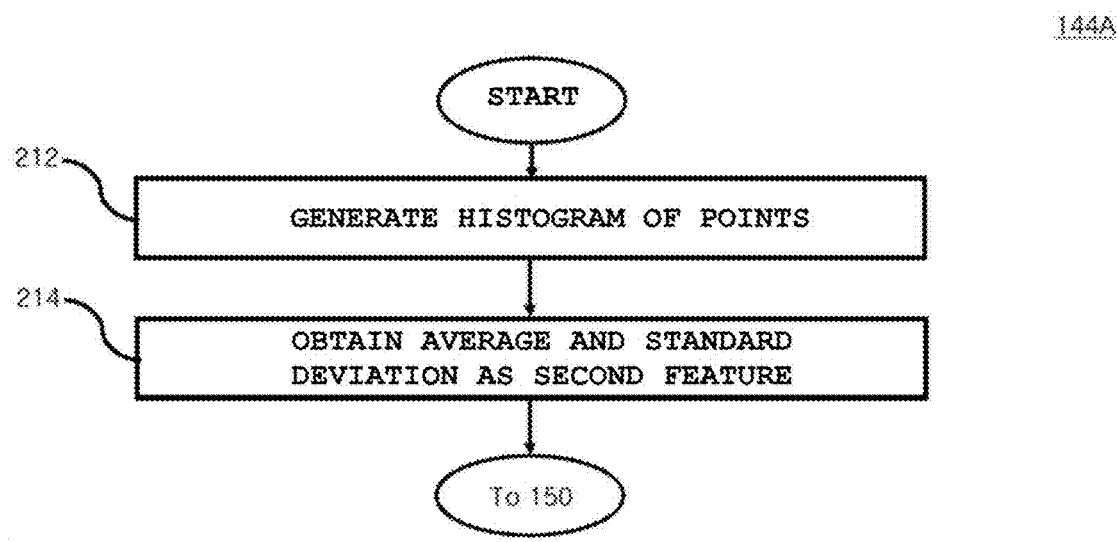
FIG. 17 is a flowchart for explaining an embodiment of step 144 shown in FIG. 2.

FIG. 17 is a flowchart for explaining an embodiment 144A of step 144 shown in FIG. 2.

A histogram is generated using the number of points included in the box of the object (step 212). In this case, a histogram may be generated using the number of points in the xy plane, which is the first plane. That is, the points used to generate the histogram may be points present in the first plane.

After step 212, an average and a standard deviation may be obtained as the second feature using a Gaussian distribution equation such as that of Equation 9 below (step 214).

$$N(np \mid \mu, \sigma^2) = \frac{1}{(2\pi\sigma^2)^{1/2}} \exp\left\{-\frac{1}{2\sigma^2}(np - \mu)^2\right\} \qquad \text{[Equation 9]}$$

Here, "np" represents the number of points in the first plane, "$\mu$" represents the average, and "$\sigma$" represents the standard deviation.

That is, the second feature $f_{Gaussian}$, composed of the average and the standard deviation obtained in step 214, may be expressed using Equation 10 below.

$$f_{Gaussian} = [\mu_x \ \mu_y \ \sigma_x \ \sigma_y] \qquad \text{[Equation 10]}$$

Here, "$\mu_x$" represents the x-axis component of the average, "$\mu_y$" represents the y-axis component of the average, "$\sigma_x$" represents the x-axis component of the standard deviation, and "$\sigma_y$" represents the y-axis component of the standard deviation.

FIG. 18 is a diagram for explaining the second feature when the type of object is a road boundary.

Figure 18A:
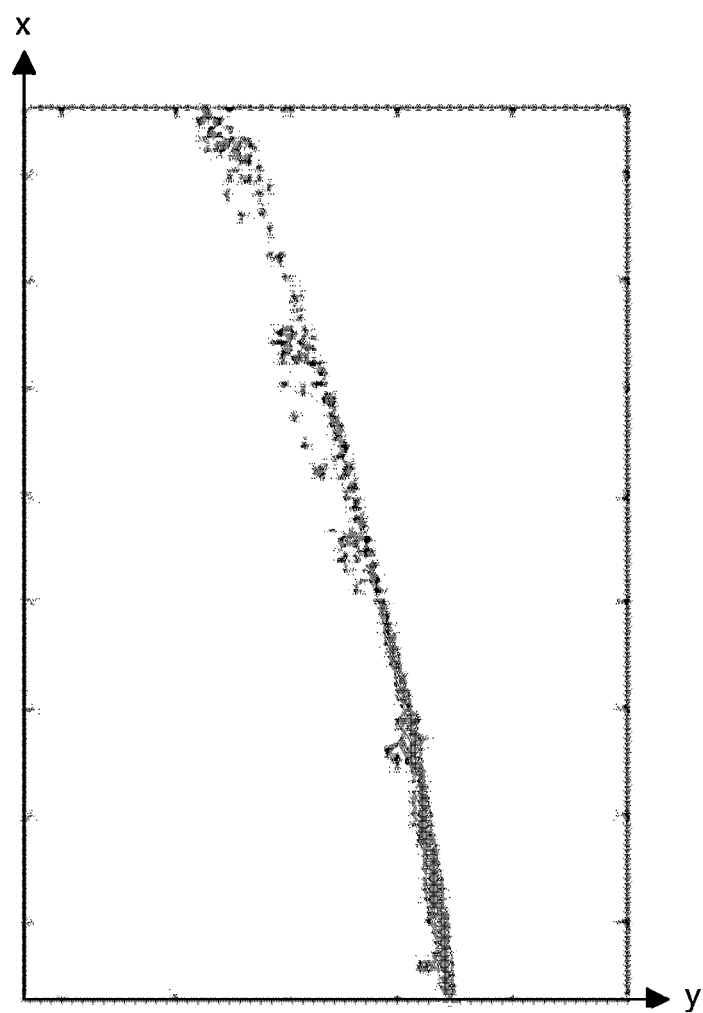
FIGS. 18A, 18B, and 18C are diagrams for explaining a second feature when the type of object is a road boundary.
Figure 18B:
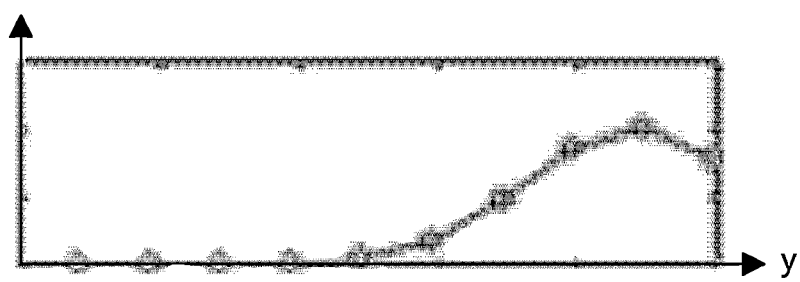
Figure 18C:
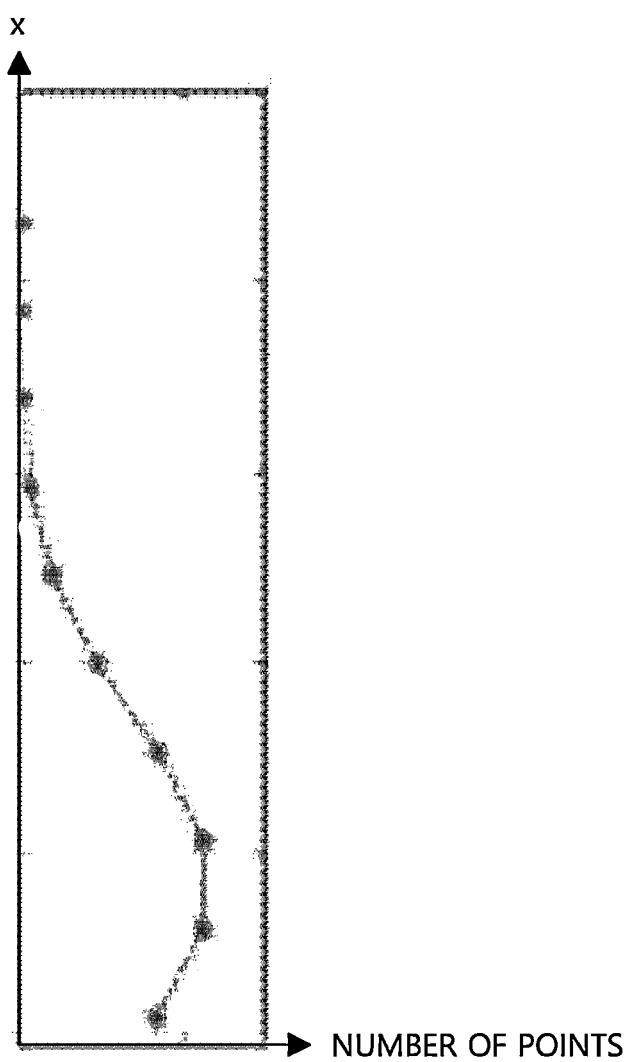

When the type of object is a road boundary and the points are distributed in the box of the object as shown in FIG. 18A, the average and the standard deviation of the Gaussian distribution with respect to the number of points distributed may be extracted as the second feature, as shown in FIG. 18B and FIG. 18C.

FIG. 19 is a diagram for explaining the second feature when the type of object is a vehicle.

Figure 19A:
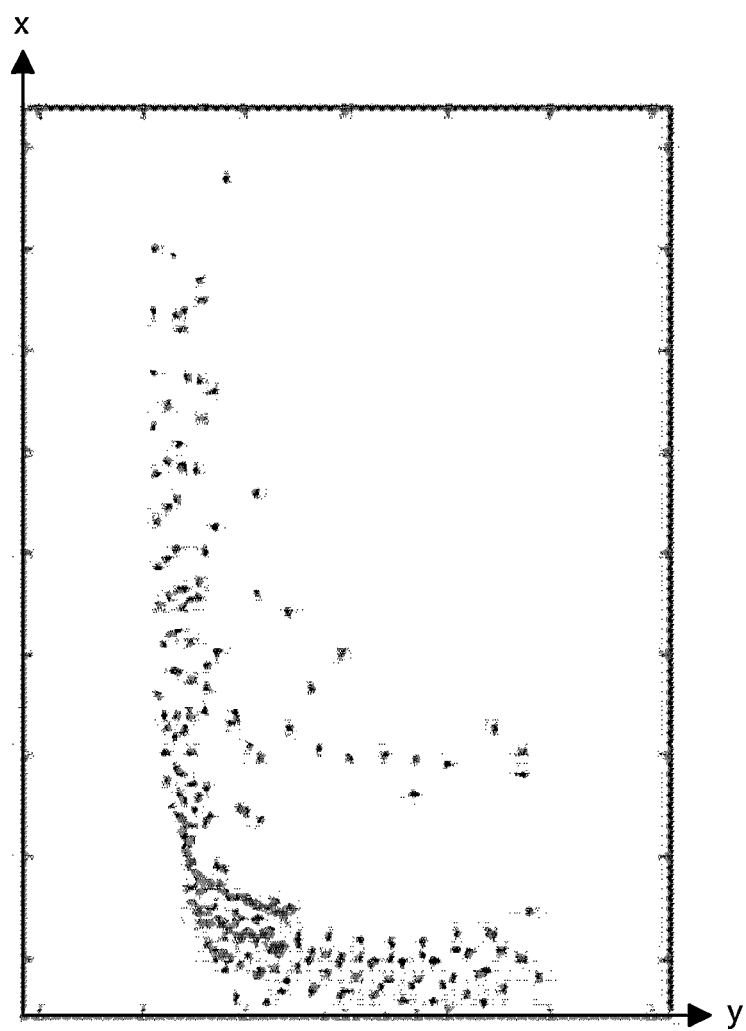
FIGS. 19A, 19B, and 19C are diagrams for explaining a second feature when the type of object is a vehicle.
Figure 19B:
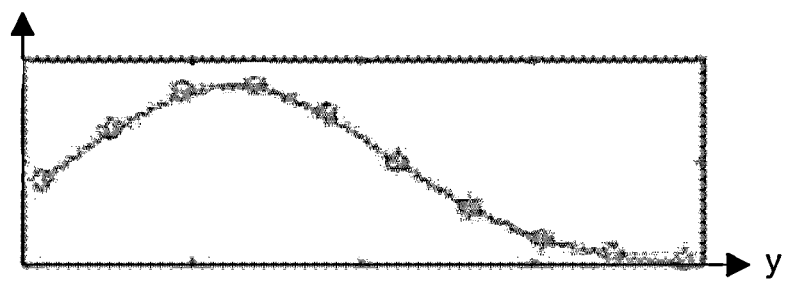
Figure 19C:
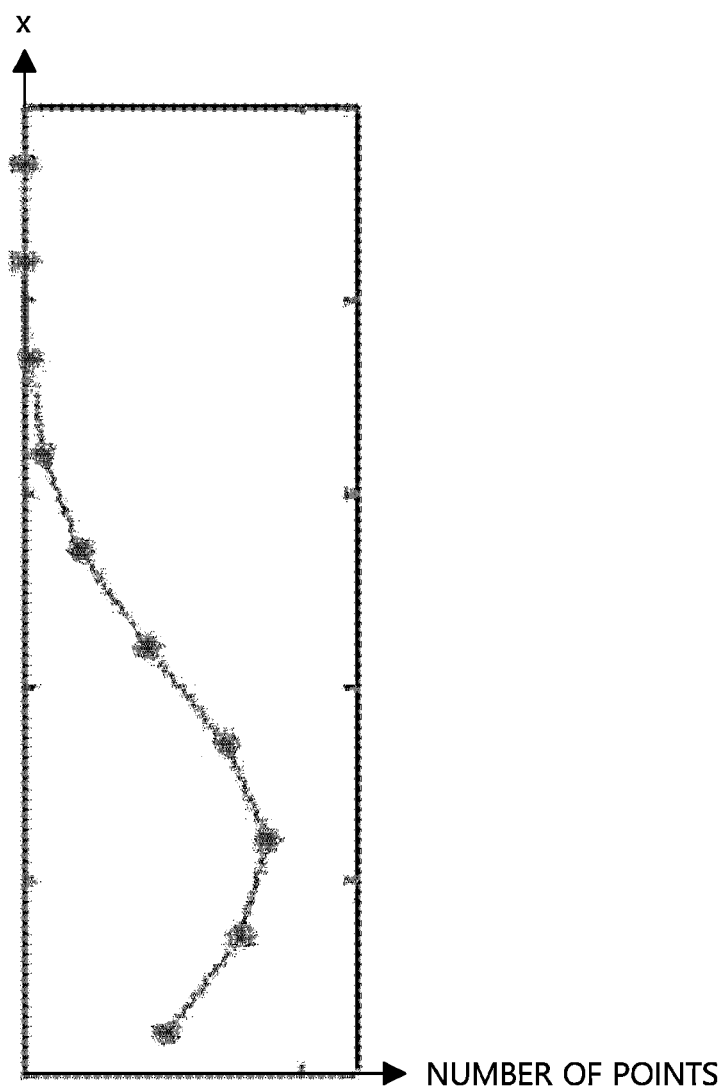

When the type of object is a vehicle and the points are distributed in the box of the object as shown in FIG. 19A, the average and the standard deviation of the Gaussian distribution with respect to the number of points distributed may be extracted as the second feature, as shown in FIG. 19B and FIG. 19C.

FIG. 20 is a diagram for explaining the second feature when the type of object is a bush.

Figure 20A:
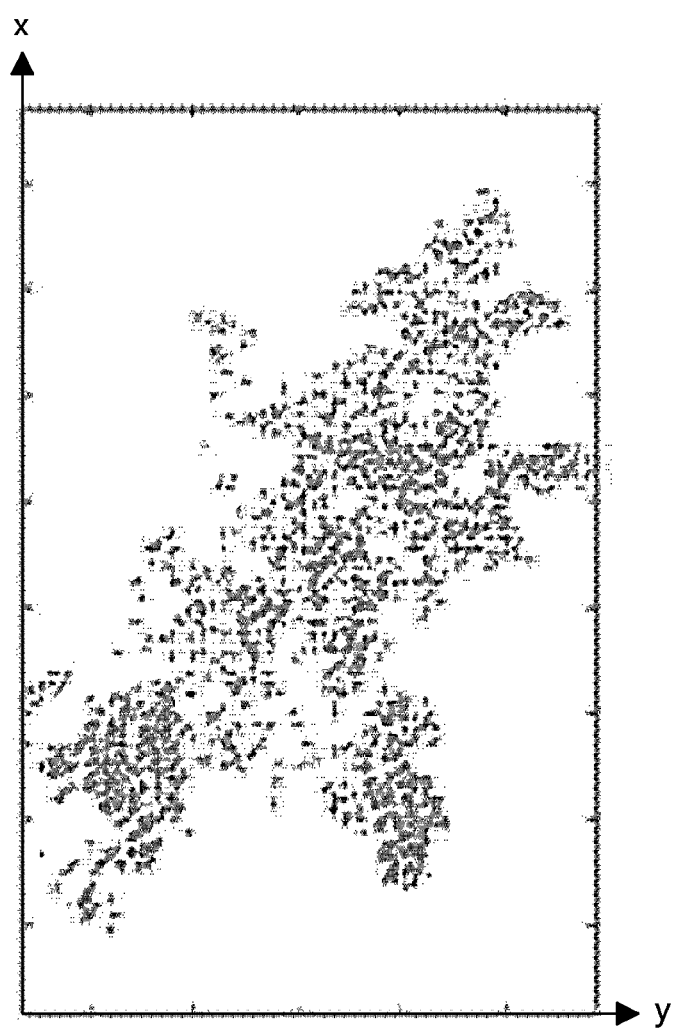
FIGS. 20A, 20B, and 20C are diagrams for explaining a second feature when the type of object is a bush.
Figure 20B:
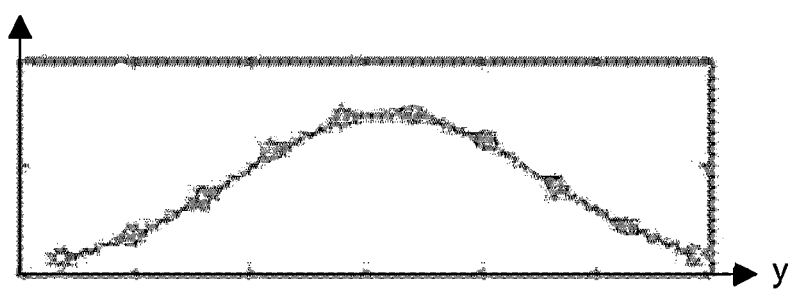
Figure 20C:
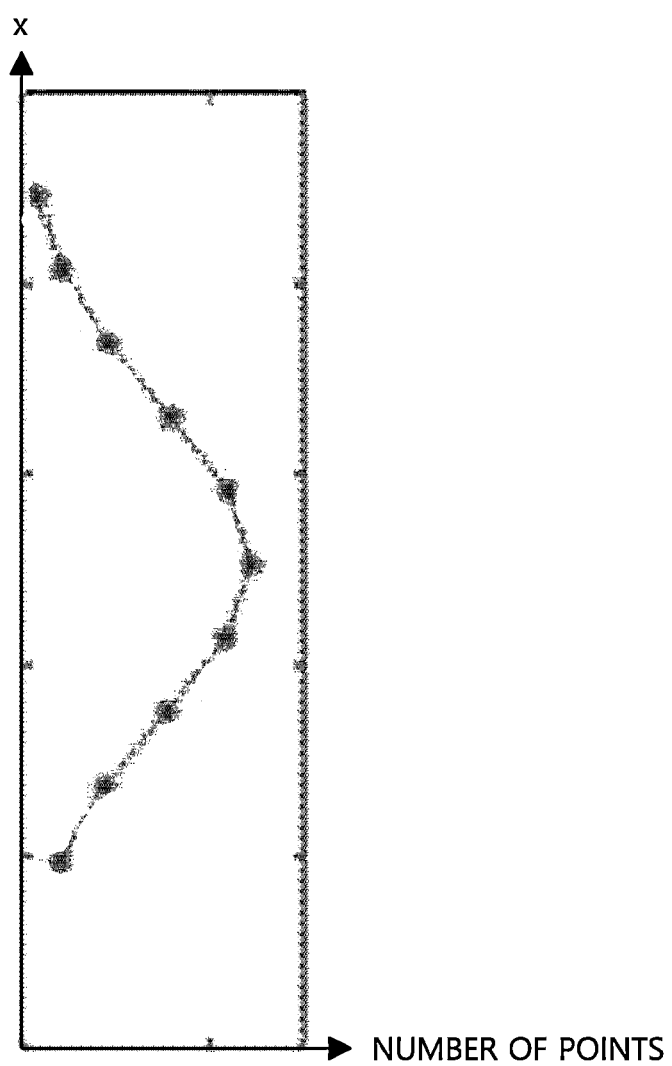

When the type of object is a bush and the points are distributed in the box of the object as shown in FIG. 20A, the average and the standard deviation of the Gaussian distribution with respect to the number of distributed points may be extracted as the second feature, as shown in FIGS. 20B and 20C.

In addition, the third to sixth features may be extracted as follows.

Figure 21:
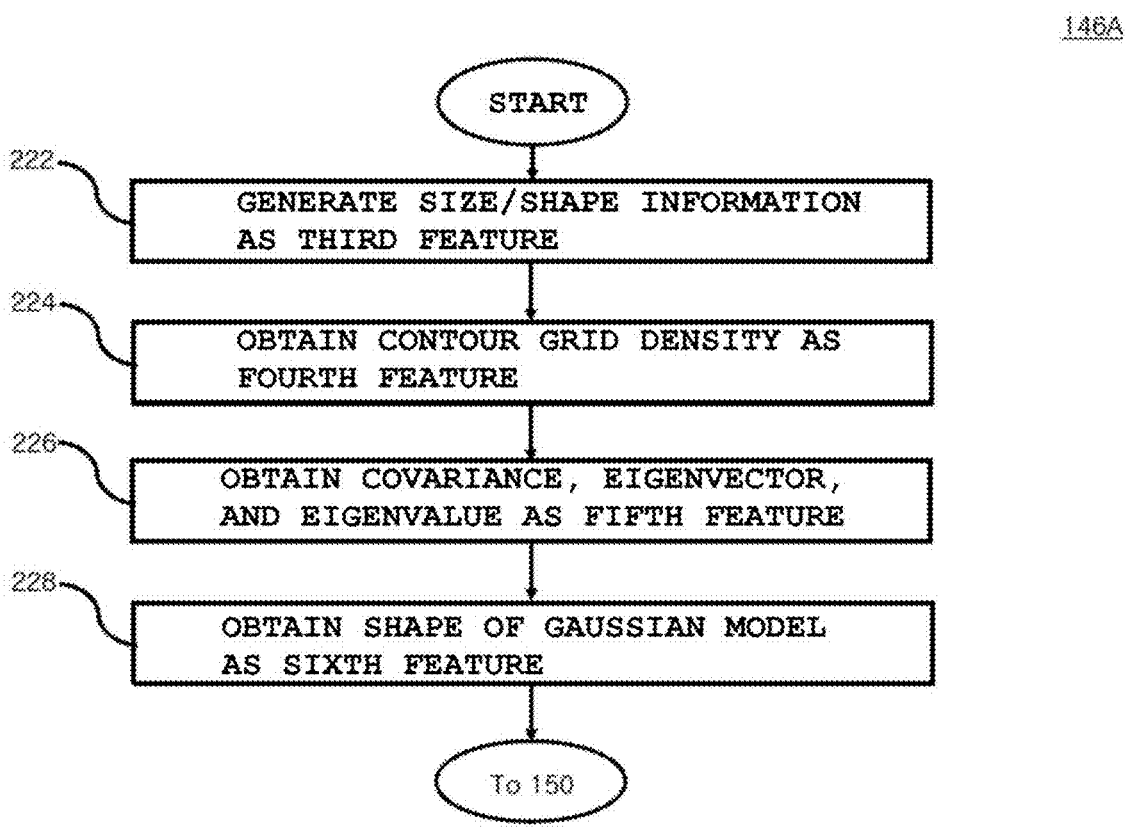
FIG. 21 is a flowchart for explaining an embodiment of step 146 shown in FIG. 2.

FIG. 21 is a flowchart for explaining an embodiment 146A of step 146 shown in FIG. 2.

Referring to FIG. 21, size/shape information on the box of the object may be extracted (or generated) as the third feature (step 222).

Figure 22:
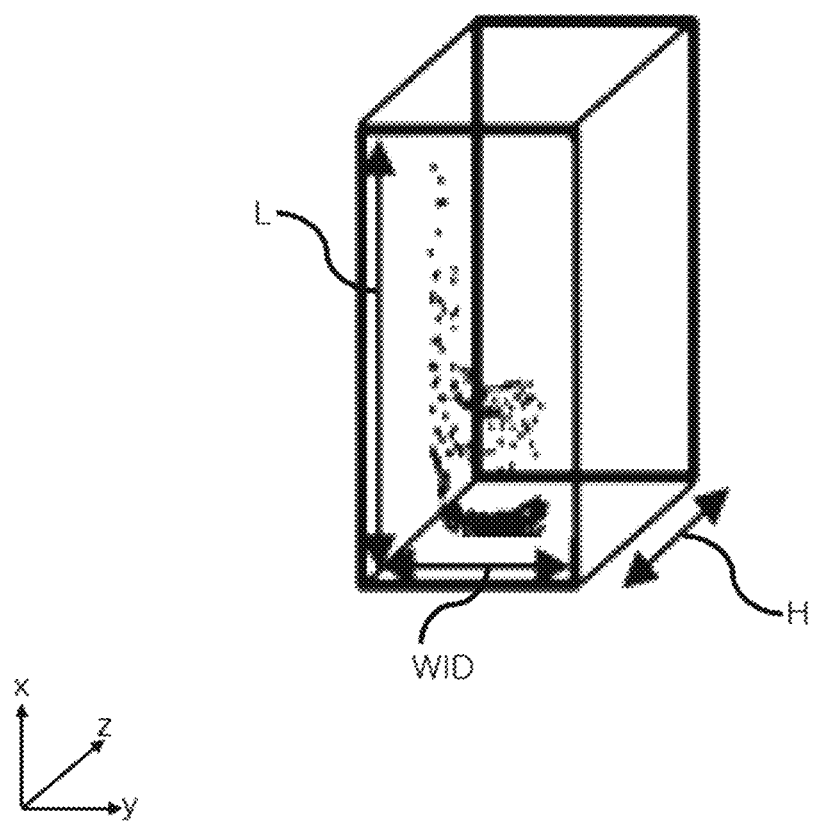
FIG. 22 is a perspective view of an example of a box of an object for explaining size/shape information, which is a third feature.

FIG. 22 is a perspective view of an example of the box of the object for explaining the size/shape information, which is the third feature.

The size/shape information may include at least one of a width WID, a height H, a length L, a first ratio R1, or a second ratio R2 of the box of the object.

The width WID is the length of the box of the object in the y-axis direction, which is the second direction. The height H is the length of the box of the object in the z-axis direction, which is the third direction. The length L is the length of the box of the object in the first direction, which is the x-axis direction. The first ratio R1 is the ratio between the width WID and the length L. The second ratio R2 is the ratio between an area A and the height H. Here, the area A is equivalent to the product of the width WID and the length L.

Referring again to FIG. 21, a contour grid density of the box of the object may be obtained as the fourth feature (step 224).

In addition, a covariance, an eigenvector, and an eigenvalue related to the box of the object may be obtained as the fifth feature (step 226). For example, a covariance matrix may be calculated using the x-axis, y-axis, and z-axis coordinate values of the points included in the box of the object, and an eigenvector and an eigenvalue may be calculated using the covariance matrix.

Figure 23:
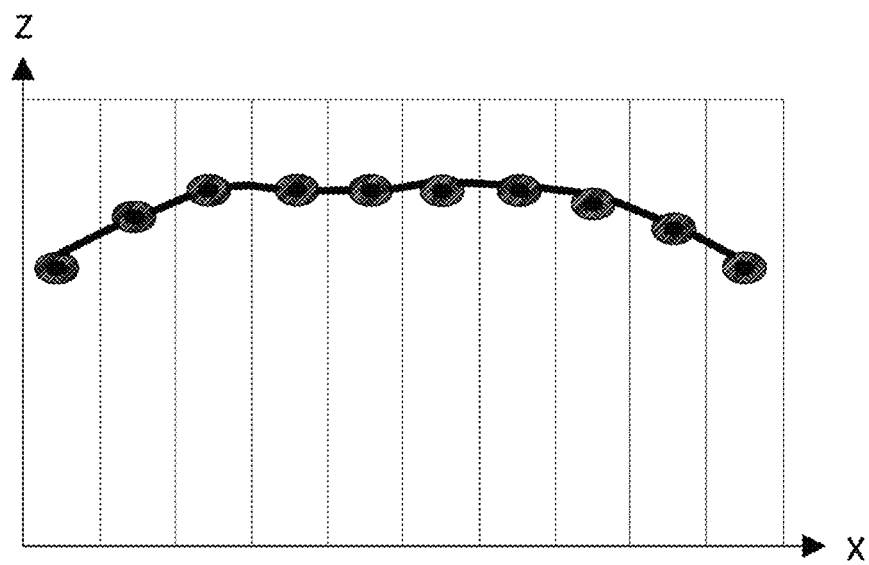
FIG. 23 is a diagram for explaining a sixth feature.

FIG. 23 is a diagram for explaining the sixth feature.

At least one of the contour of the Gaussian model in the first plane or the contour of the Gaussian model in the second plane may be obtained as the sixth feature (step 228). For example, the contour, which is the sixth feature, may have a curved shape, as shown in FIG. 23.

For example, the contour of the Gaussian model on y-axis may be the same as that shown in FIG. 18B, in FIG. 19, or FIG. 20B. The contour of the Gaussian model on x-axis may be the same as that shown in FIG. 18C, FIG. 19C, or FIG. 20C.

Although it is illustrated in FIG. 21 that the fourth feature is obtained after the third feature is generated, that the fifth feature is obtained after the fourth feature is generated, and that the sixth feature is obtained after the fifth feature is generated, the embodiments are not limited thereto. That is, unlike what is illustrated in FIG. 21, steps 222 to 228 may be performed in any order, and the process may proceed to step 150 after each of steps 222 to 228 is performed.

The type of object may be classified using at least one of the first to sixth features obtained as described above (step 150).

According to an embodiment, the type of object may be classified using at least one of the first or second feature and at least one of the third, fourth, or fifth feature.

According to another embodiment, the type of object may be classified using the first, second, third, and fourth features. Alternatively, the type of object may be classified using the first, second, third, and fifth features. Alternatively, the type of object may be classified using the first, second, third, fourth, and fifth features.

When the type of object is a pedestrian, the type of object may be classified as a pedestrian using at least one of the $1\text{-}1^{st}$ or $1\text{-}2^{nd}$ feature shown in in FIG. 16A and FIG. 16B.

Also, when the type of object is a road boundary, the type of object may be classified as a road boundary using the first ratio R1 included in the third feature. The reason for this is that, in the case of a road boundary, the length L is greater than the width WID.

Also, when the type of object is a tree or a sign, the type of object may be classified as a tree or a sign using the second ratio R2 included in the third feature. The reason for this is that, in the case of an object such as a tree or a sign, the ratio of the height H to the area A is relatively large.

Meanwhile, according to the embodiment, the type of object may be classified by a neural network classification method using at least one of the first to sixth features. The neural network classification method will be described later with reference to FIG. 25.

According to an embodiment, the type of object may be classified using at least one of the first to sixth features through a plurality of support vector machines (SVMs). Since such an SVM is well known, a detailed description thereof will be omitted.

According to another embodiment, the type of object may be classified using at least one of the first to sixth features through a multi-layer perceptron (MLP).

Meanwhile, a recording medium in which a program for executing the above-described object classification method is recorded may store a program to implement a function of transforming the rectangular coordinates of points included in a box of an object obtained from a point cloud acquired using a LiDAR sensor into complex coordinates, a function of performing Fast Fourier Transform (FFT) on the complex coordinates to extract a first feature, a function of obtaining an average and a standard deviation, which are parameters of the Gaussian model for the points included in the box of the object, as a second feature, and a function of classifying the type of object using at least one of the first feature or the second feature. The recording medium may be read by a computer system.

The computer-readable recording medium such as a non-transitory computer-readable recording medium includes all kinds of recording devices in which data capable of being read by a computer system are stored. Examples of the computer-readable recording medium include Read-Only Memory (ROM), Random Access Memory (RAM), Compact Disk ROM (CD-ROM), magnetic tape, floppy discs, and optical data storage. The computer-readable recording medium can also be distributed over network-connected computer systems so that computer-readable code is stored and executed in a distributed fashion. Also, functional programs, code, and code segments for accomplishing the object classification method can be easily devised by programmers skilled in the art to which the present disclosure pertains. When a computer or a processor is configured to execute the functional programs, code, or code segments, the computer or the processor may be configured to perform the operations or functions according to various embodiments of the present disclosure.

Hereinafter, the object classification apparatus 300 according to the embodiment will be described with reference to the accompanying drawings.

Figure 24:
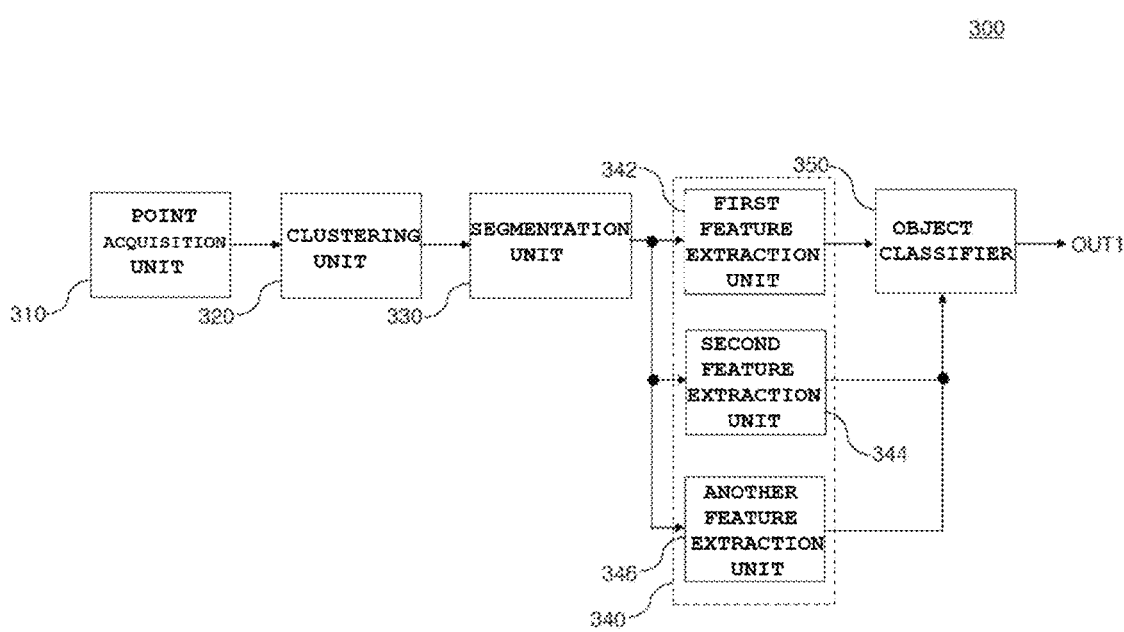
FIG. 24 is a block diagram of an object classification apparatus according to an embodiment.

FIG. 24 is a block diagram of the object classification apparatus 300 according to the embodiment.

The object classification apparatus 300 shown in FIG. 24 may perform the object classification method 100 shown in FIG. 1, but the embodiments are not limited thereto.

Although the object classification method 100 shown in FIG. 1 will be described as being performed by the object classification apparatus 300 shown in FIG. 24, the embodiments are not limited thereto. That is, according to another embodiment, the object classification method 100 shown in FIG. 1 may also be performed by an object classification apparatus configured differently from the object classification apparatus 300 shown in FIG. 24.

The object classification apparatus 300 according to the embodiment may include a point acquisition unit (or a point acquisition module) 310, a clustering unit (or a clustering module) 320, a segmentation unit (or a segmentation module) 330, a feature extraction unit (or a feature extraction module) 340, and an object classifier (or an object classifier module) 350. One or more of the components of the object classification apparatus 300, or the object classification apparatus 300 may include a computer or a processor. The corresponding operations or functions of the components of the object classification apparatus 300 may be implemented as functional programs, code, or code segments. When a respective computer or a process is configured to execute corresponding functional programs, code, or code segments, such a computer or such a processor may be configured to perform the corresponding operations or functions according to various embodiments of the present disclosure.

The point acquisition unit 310 may acquire a point cloud, and may output the acquired point cloud to the clustering unit 320. For example, the point acquisition unit 310 may be implemented as a LiDAR sensor. The point acquisition unit 310 may perform step 110 shown in FIG. 1.

The clustering unit 320 may cluster the point cloud acquired by the point acquisition unit 310. That is, the clustering unit 320 may perform step 120 shown in FIG. 1.

The segmentation unit 330 may generate a box of the object by performing segmentation on the result of clustering by the clustering unit 320. That is, the segmentation unit 330 may perform step 130 shown in FIG. 1.

The feature extraction unit 340 may extract at least one of the first to sixth features using the box of the segmented object, and may output the extracted feature to the object classifier 350. That is, the feature extraction unit 340 may perform step 140 shown in FIG. 1 or step 140A shown in FIG. 2.

To this end, the feature extraction unit 340 may include at least one of a first feature extraction unit 342, a second feature extraction unit 344, or another feature extraction unit 346.

The first feature extraction unit 342 converts the rectangular coordinates of the points included in the box of the object into complex coordinates, performs Fast Fourier Transform (FFT) on the complex coordinates to extract the first feature, and outputs the extracted first feature to the object classifier 350. That is, the first feature extraction unit 342 serves to perform step 142 shown in FIG. 2 or step 142A shown in FIG. 3.

The second feature extraction unit 344 obtains an average and a standard deviation, which are parameters of the Gaussian model for the points included in the box of the object, and outputs the average and the standard deviation to the object classifier 350 as the second feature. That is, the second feature extraction unit 344 serves to perform step 144 shown in FIG. 2 or step 144A shown in FIG. 17.

In addition, the another feature extraction unit 346 extracts at least one of the third to sixth features of the points included in the box of the object as another feature, and outputs the another feature to the object classifier 350. That is, the another feature extraction unit 346 serves to perform step 146 shown in FIG. 2 or step 146A shown in FIG. 21.

The object classifier 350 classifies the type of object based on the result of learning using at least one of the first to sixth features extracted by the feature extraction unit 340 as input, and outputs the result of classification through an output terminal OUT1. That is, the object classifier 350 serves to perform step 150 shown in FIG. 1.

Figure 25:
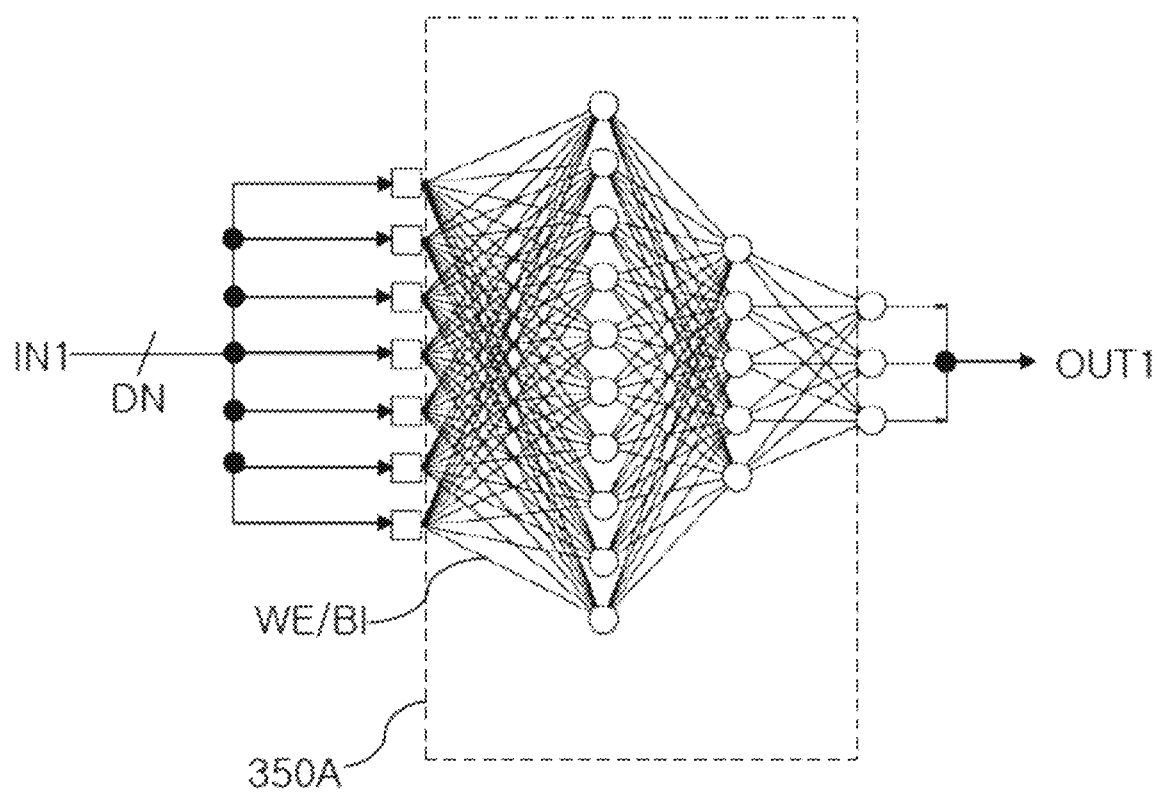
FIG. 25 is a diagram for explaining an embodiment of an object classifier.

FIG. 25 is a diagram for explaining an embodiment 350A of the object classifier 350.

The object classifier 350 shown in FIG. 24 may be implemented as the neural network classifier 350A shown in FIG. 25. The neural network classifier 350A receives at least one of the first to sixth features through an input terminal IN1, classifies the type of object, and outputs the result of classification through the output terminal OUT1. The neural network classifier 350A may classify the type of object through learning of the feature input thereto through the input terminal IN1. That is, the neural network classifier 350A may recognize the type of object to be classified by applying a weight WE and a bias BI, obtained as the result of learning, to a corresponding object prediction system, and may output information about the recognized type of object through the output terminal OUT1. This information may be provided to a tracking system as data for autonomous driving of the vehicle so that the tracking system tracks the object.

For example, as shown in FIG. 25, the number DN of DIMENSIONs provided through the input terminal IN1 may be 97, and three types of objects may be output through the output terminal OUT1, but the embodiments are not limited thereto. For example, 97 DIMENSIONs are shown in Table 1 below.

TABLE 1

| Name of Feature | Type of Feature | Content of Feature | DIMENSION |
| --- | --- | --- | --- |
| First Feature (1-1$^{st}$ & 1-2$^{nd}$ Features) | Two-dimensional (2D) FFT | $F_{XY}$, $F_{XZ}$ | 32 (k = 16) |
| Second Feature | Model Fitting | Gaussian Model Parameters (Average ($\mu$), Standard Deviation ($\sigma$)) | 2 |
| Third Feature | Size/Shape Information on Object | WID, L, H, R1, R2 | 5 |
| Fourth Feature | Grid Density | Contour Grid Density | 40 |
| Fifth Feature | Covariance | Covariance, Eigenvector, Eigenvalue | 18 |

In the fifth feature shown in Table 1 above, the number of covariances may be 6, the number of eigenvectors may be 9, and the number of eigenvalues may be 3.

In addition, the classified types of objects, which are output through the output terminal OUT1 shown in FIG. 25, may be a road boundary, a vehicle, and a bush, but the embodiments are not limited thereto.

According to an embodiment, the neural network classifier 350A shown in FIG. 25 may be implemented as a multi-layer perceptron (MLP) classifier. Since such a multi-layer perceptron (MLP) classifier is well known, a detailed description thereof will be omitted.

According to another embodiment, the neural network classifier 350A shown in FIG. 25 may be implemented as a plurality of support vector machines.

Figure 26:
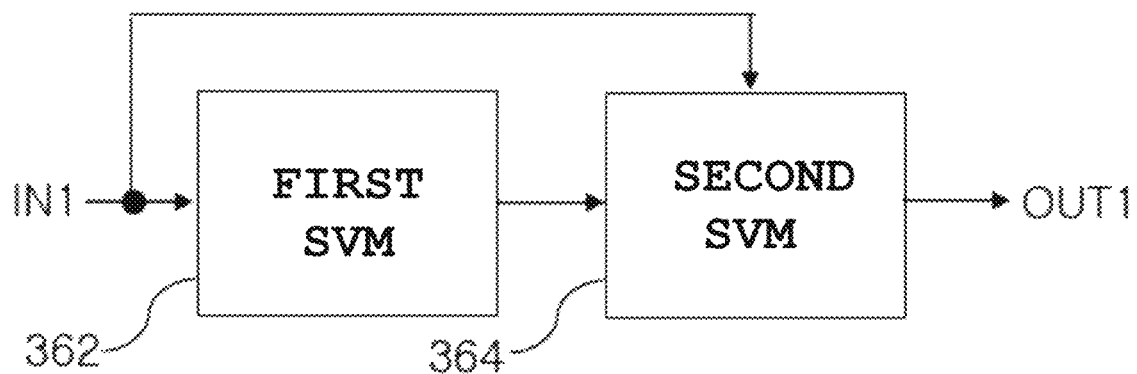
FIG. 26 is a block diagram of an embodiment 352 of the object classifier.

FIG. 26 is a block diagram of an embodiment 352 of the object classifier 350.

The object classifier 352 according to an embodiment may include first and second support vector machines 362 and 364. Also, the neural network classifier 350A may include first and second support vector machines 362 and 364.

For example, the plurality of support vector machines may include first and second support vector machines 362 and 364, as shown in FIG. 26.

If the object classifier 350 is capable of classifying an object into three types, for example, a road boundary, a vehicle, and a bush, the first and second support vector machines 362 and 364 may receive at least one of the first to sixth features through the input terminal IN1, may classify the type of object, and may output the result of classification through the output terminal OUT1.

For example, the first support vector machine 362 determines whether the type of object is a road boundary using at least one of the first to sixth features received through the input terminal IN1, and outputs the result of the determination to the second support vector machine 364.

When it is determined that the type of object is not a road boundary based on the result of the determination by the first support vector machine 362, the second support vector machine 364 determines whether the type of object is a vehicle or a bush using at least one of the first to sixth features received through the input terminal IN1, and outputs the result of the determination through the output terminal OUT1.

Hereinafter, an object classification method according to a comparative example and the object classification method according to the embodiment will be described.

The object classification method described in the above-mentioned related art document (Robust Vehicle Detection using 3D Lidar under Complex Urban Environment) (hereinafter referred to as the "object classification method according to the comparative example") is a binary classification method of classifying the type of object as either a vehicle or any other kind of object.

FIG. 27 is a diagram for explaining an example of misclassification by the object classification method according to the comparative example.

Figure 27A:
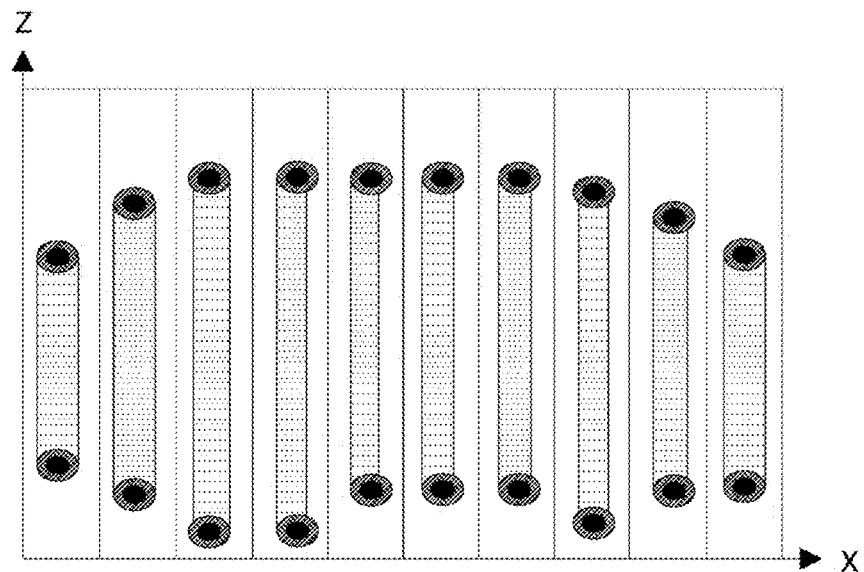
FIGS. 27A and 27B are diagrams for explaining an example of misclassification by an object classification method according to a comparative example.

In order to perform the object classification method according to the comparative example, among eight kinds of features (the number of DIMENSIONs is 59), information indicating the shape in the xy plane, which is the profile of the object, is calculated as a height value (Height) in each of ten sections Bin in the width direction (Length) of the object, as shown in FIG. 27A, and the result of calculation is learned as a main feature point of the classifier.

However, if an unnecessary noise point (e.g., "NP" shown in FIG. 27B) is included in a portion of at least one of the ten sections shown in FIG. 27A, the result of calculation is easily affected by a change in the shape of the object. Further, when this result of calculation is learned as a feature point, object classification performance may be deteriorated.

Furthermore, in the case of the object classification method according to the comparative example, since only fifty-nine features (the number of DIMENSIONs is 59) are provided as input for learning by the classifier, static objects (e.g., a guardrail, a bush, etc.) in the road environment may be misclassified, and thus object classification performance may be deteriorated.

FIG. 28 is a diagram for explaining another example of misclassification by the object classification method according to the comparative example.

Figure 28A:
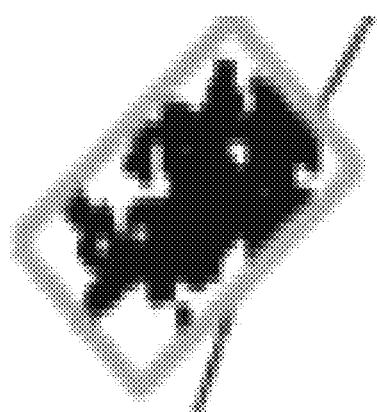
FIGS. 28A and 28B are diagrams for explaining another example of misclassification by the object classification method according to the comparative example.
Figure 28B:
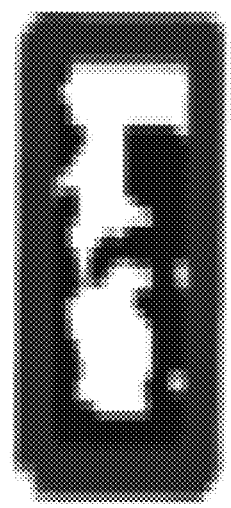

In the case of the comparative example, when learning is performed using only the size/shape information on an object as a feature, the probability of the occurrence of misclassification between the bush shown in FIG. 28A and the vehicle shown in (FIG. 28B increases.

In contrast, in the case of the object classification method and apparatus according to the embodiments, since the first to sixth features, particularly the first feature extracted using FFT and the second feature, which is a parameter of the Gaussian model, are used, classification between objects having similar sizes and shapes may be possible. The shape information on the distribution of the point cloud in the object in the first plane (i.e. the xy plane) and the second plane (i.e. the xz plane) is extracted as a feature by using FFT, and the shape information, which is robust against noise points that may occur, is extracted as a feature for determining the region of interest in the distribution of the points in the object, which is a parameter of the Gaussian model, thereby improving object classification performance.

Also, unlike the above-described comparative example, which classifies an object into two types, the embodiment may classify an object into at least three types.

Due to the characteristics of the LiDAR sensor, as the distance from the host vehicle to an object increases, it becomes more difficult to classify the object based only on the size and shape of the object. In contrast, in the case of the embodiment, at least one of the first feature or the second feature is used, thereby securing object classification performance irrespective of the distance from the host vehicle to an object to be classified.

Figure 27B:
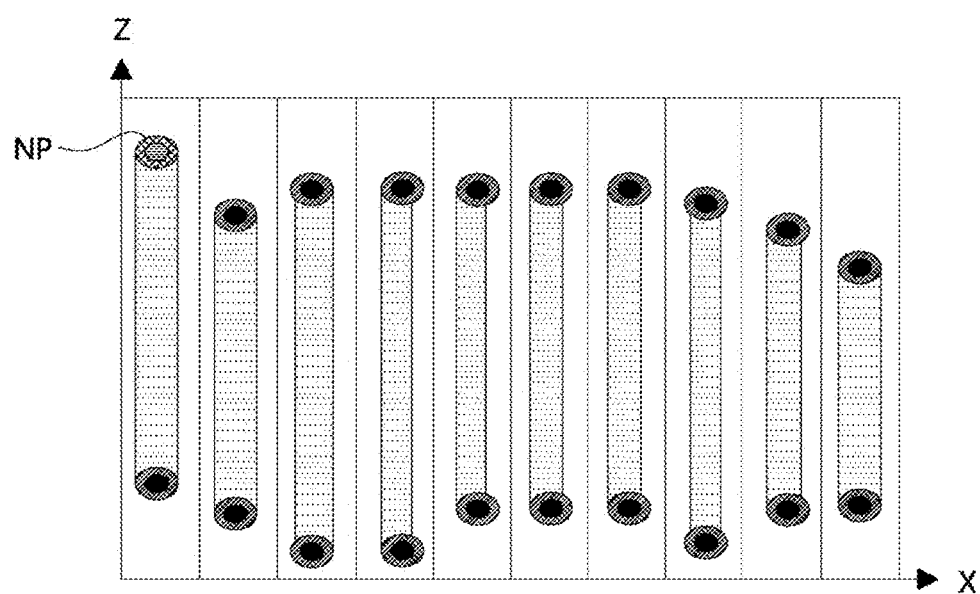

In addition, even if the noise point NP shown in FIG. 27B is included in the box of the object, when the type of object is classified using the first feature extracted using FFT, the influence of the noise point is small, thereby making it possible to prevent deterioration in object classification performance.

In addition, in the case of the embodiment, the first and second features can be extracted in real time, and the appearance of the structure of the object can be determined based on the extracted features, thereby making it possible to improve the performance of classifying a static object such as a road boundary or a bush.

In addition, in the case of the object classification method according to the comparative example, Ring Gradient Based Local Optimal Segmentation (RGLOS) needs to be performed in order to accurately classify an object. In contrast, in the case of the object classification method according to the embodiment, it is possible to accurately classify an object without the necessity to perform the above specific segmentation according to the comparative example.

In addition, even in the case in which the size and shape of an object (e.g., the width, length, and height of an object) vary depending on the position of the object and thus it is difficult to classify the object, the object classification method according to the embodiment may exhibit improved object classification performance irrespective of the position of the object by extracting at least one of the first feature or the second feature and using the same.

In addition, the embodiment may intuitively classify the type of object, such as a road boundary, a vehicle, or a bush, using at least one of the third, fourth, or fifth feature.

FIGS. 29A and 29B and 30A and 30B are diagrams for explaining the result of classifying the type of object by the object classification method and apparatus according to the embodiments.

Figure 29A:
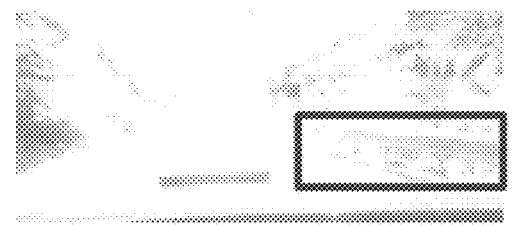
FIGS. 29A and 29B and 30A and 30B are diagrams for explaining the result of classifying the type of object by the object classification method and apparatus according to the embodiments.
Figure 29B:
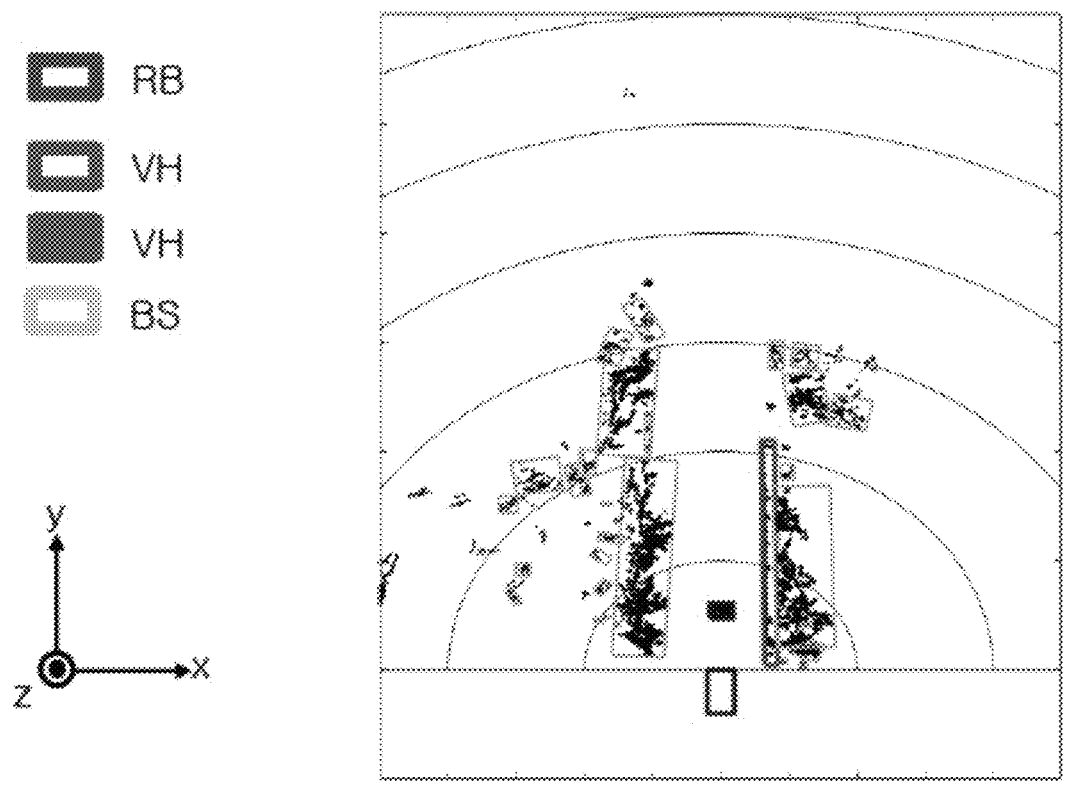

When the environment surrounding the host vehicle is as shown in FIG. 29A, according to the object classification method according to the embodiment, a road boundary RB, a vehicle VH, and a bush BS may be classified as shown in FIGS. 29A and 29B.

Figure 30A:
Figure 30B:
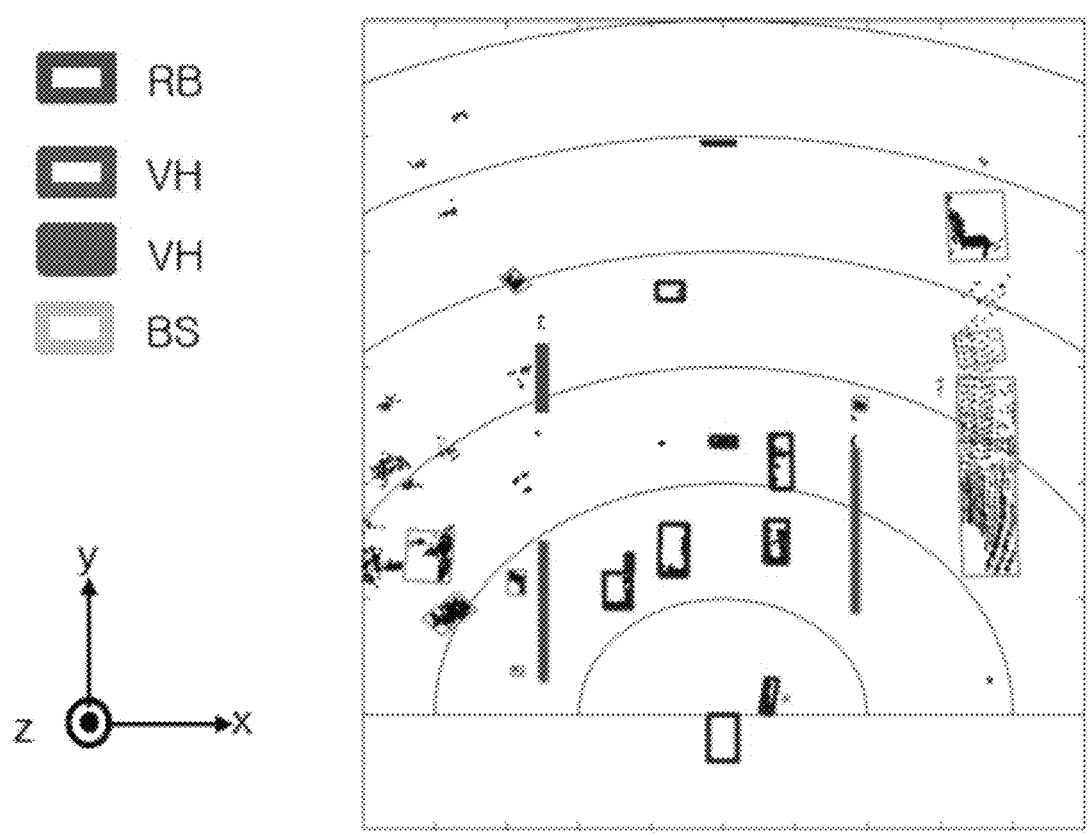

Alternatively, when the environment surrounding the host vehicle is as shown in FIG. 30A, according to the object classification method according to the embodiment, a road boundary RB, a vehicle VH, and a bush BS may be classified as shown in FIG. 30B.

As is apparent from the above description, according to the method and apparatus for classifying an object and the recording medium storing a program to execute the method according to the embodiments, it is possible to easily achieve classification between objects having similar sizes and shapes. In addition, since shape information that is robust against noise points is extracted as a feature, it is possible to improve object classification performance, to classify an object into at least three types, and to secure object classification performance irrespective of the distance from the host vehicle to an object to be classified. In addition, since the influence of noise points is small, it is possible to prevent deterioration in object classification performance, to improve the performance of classifying a static object such as a road boundary or a bush, to accurately classify the type of object without the necessity to perform specific segmentation, to improve object classification performance irrespective of the position of an object, and to intuitively classify the type of object, such as a road boundary, a vehicle, or a bush.

A method of autonomously driving of vehicle according to the embodiment includes extracting a first feature by transforming rectangular coordinates of points included in a box of the object, obtained from a point cloud acquired using a LiDAR sensor, into complex coordinates and performing Fast Fourier Transform (FFT) on the complex coordinates; obtaining an average and a standard deviation as a second feature, the average and the standard deviation being parameters of a Gaussian model for the points included in the box of the object; classifying a type of the object based on at least one of the first feature or the second feature; and autonomously driving a host vehicle based on the classified type of the object.

However, the effects achievable through the embodiments are not limited to the above-mentioned effects, and other effects not mentioned herein will be clearly understood by those skilled in the art from the above description.

The above-described various embodiments may be combined with each other without departing from the scope of the present disclosure unless they are incompatible with each other.

In addition, for any element or process that is not described in detail in any of the various embodiments, reference may be made to the description of an element or a process having the same reference numeral in another embodiment, unless otherwise specified.

While the present disclosure has been particularly shown and described with reference to exemplary embodiments thereof, these embodiments are only proposed for illustrative purposes, and do not restrict the present disclosure, and it will be apparent to those skilled in the art that various changes in form and detail may be made without departing from the essential characteristics of the embodiments set forth herein. For example, respective configurations set forth in the embodiments may be modified and applied. Further, differences in such modifications and applications should be construed as falling within the scope of the present disclosure as defined by the appended claims.

What is claimed is:

1. A method of classifying an object, the method comprising:
   extracting, by a processor, a first feature by transforming rectangular coordinates of points included in a box of the object, obtained from a point cloud acquired using a LiDAR sensor, into complex coordinates and performing Fast Fourier Transform (FFT) on the complex coordinates;
   obtaining, by the processor, an average and a standard deviation as a second feature, the average and the standard deviation being parameters of a Gaussian model for the points included in the box of the object;
   classifying, by the processor, a type of the object based on at least one of the first feature or the second feature; and
   controlling, by the processor, a host vehicle to autonomously drive based on the classified type of the object.

2. The method according to claim 1, further comprising:
   acquiring, by the processor, the point cloud;
   clustering, by the processor, the point cloud; and
   obtaining, by the processor, the box of the object by performing segmentation on a result of the clustering.

3. The method according to claim 2, wherein the rectangular coordinates include at least one of:
   coordinates in a first plane based on a first axis and a second axis, the first axis being parallel to a first direction in which the host vehicle travels, the second axis being parallel to a second direction; or
   coordinates in a second plane based on a third axis and the first axis, the third axis being parallel to a third direction perpendicular to each of the first direction and the second direction, the third direction being a height direction of the host vehicle.

4. The method according to claim 3, wherein the extracting the first feature comprises:
   transforming the rectangular coordinates of the points included in the box of the object into the complex coordinates; and
   determining complex vectors of the points included in the box, obtained by performing FFT on the complex coordinates of the points included in the box, as the first feature.

5. The method according to claim 4, wherein the extracting the first feature further comprises:
   determining a result of concatenation of a feature obtained for the first plane and a feature obtained for the second plane as the first feature.

6. The method according to claim 3, wherein the extracting the second feature comprises:

generating a histogram based on a number of points included in the box of the object; and determining the average and the standard deviation, obtained based on the histogram, as the second feature.

7. The method according to claim 6, wherein the points used to generate the histogram are points present in the first plane.

8. The method according to claim 3, further comprising:
obtaining, by the processor, at least one of a contour of a Gaussian model in the first plane or a contour of a Gaussian model in the second plane as a sixth feature, wherein the classifying the type of the object is further based on the sixth feature.

9. The method according to claim 1, wherein the classifying a type of the object is performed through a neural network classification method based on at least one of the first feature or the second feature.

10. The method according to claim 1, wherein the classifying a type of the object is performed through a plurality of support vector machines based on at least one of the first feature or the second feature.

11. The method according to claim 1, wherein the classifying a type of the object is performed through one multi-layer perceptron based on at least one of the first feature or the second feature.

12. The method according to claim 1, wherein the type of the object includes at least one of a road boundary, a vehicle, a bush, a tree, or a sign.

13. The method according to claim 1, wherein the type of the object includes a pedestrian, and wherein the type of the object is classified as the pedestrian based on the first feature.

14. The method according to claim 1, further comprising at least one of:

generating, by the processor, size/shape information on the box of the object as a third feature;

generating, by the processor, a contour grid density of the box of the object as a fourth feature; or generating, by the processor, a covariance, an eigenvector, and an eigenvalue related to the box of the object as a fifth feature, wherein the type of the object is classified based on at least one of the first feature or the second feature and at least one of the third feature, the fourth feature, or the fifth feature.

15. An apparatus for classifying an object, the apparatus comprising:

a processor; and a computer-readable recording medium storing a program, when executed by the processor, causing the processor to:

extract a first feature by transforming rectangular coordinates of points included in a box of the object, obtained from a point cloud acquired through a LiDAR sensor, into complex coordinates and performing Fast Fourier Transform (FFT) on the complex coordinates;

obtain an average and a standard deviation and to output the average and the standard deviation as a second feature, the average and the standard deviation being parameters of a Gaussian model for the points included in the box of the object;

classify a type of the object based on at least one of the first feature or the second feature; and control a host vehicle to autonomously drive based on the classified type of the object.

16. The apparatus according to claim 15, wherein the computer-readable recording medium stores the program, when executed by the processor, further causing the processor to:

acquire the point cloud;

cluster the point cloud; and obtain the box of the object by performing segmentation on a result of the clustering.

17. The apparatus according to claim 15, wherein the computer-readable recording medium stores the program, when executed by the processor, further causing the processor to receive at least one of the first feature or the second feature as input and to output the type of the object.

18. The apparatus according to claim 17, wherein a plurality of support vector machines, implemented with the processor, are configured to classify the type of the object based on at least one of the first feature or the second feature.

19. The apparatus according to claim 18, wherein the plurality of support vector machines comprises:

a first support vector machine configured to determine whether the type of the object is a road boundary; and a second support vector machine configured to determine whether the type of the object is a vehicle or a bush.

20. A non-transitory computer-readable recording medium storing a program which, when executed by a processor, causes the processor to perform a method of classifying an object is recorded, the method comprising:

extracting a first feature by transforming rectangular coordinates of points included in a box of the object, obtained from a point cloud acquired through a LiDAR sensor, into complex coordinates and performing Fast Fourier Transform (FFT) on the complex coordinates;

obtaining an average and a standard deviation as a second feature, the average and the standard deviation being parameters of a Gaussian model for the points included in the box of the object;

classifying a type of the object based on at least one of the first feature or the second feature; and controlling a host vehicle to autonomously drive based on the classified type of the object.

* * * * *